United States Patent
Sano

(10) Patent No.: US 7,161,976 B2
(45) Date of Patent: Jan. 9, 2007

(54) INTERFERENCE CANCELLER

(75) Inventor: Hiroyasu Sano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 570 days.

(21) Appl. No.: 10/477,756

(22) PCT Filed: May 17, 2002

(86) PCT No.: PCT/JP02/04806

§ 371 (c)(1),
(2), (4) Date: Nov. 25, 2003

(87) PCT Pub. No.: WO02/098019

PCT Pub. Date: Dec. 5, 2002

(65) Prior Publication Data

US 2004/0131134 A1   Jul. 8, 2004

(30) Foreign Application Priority Data

May 25, 2001   (JP) .............................. 2001-156967

(51) Int. Cl.
*H04B 1/69* (2006.01)
*H04B 1/707* (2006.01)
*H04B 1/713* (2006.01)

(52) U.S. Cl. .................. 375/148; 375/140; 375/147

(58) Field of Classification Search ................ 375/140, 375/147, 148
See application file for complete search history.

(56) References Cited

FOREIGN PATENT DOCUMENTS

| JP | 10-190495 | 7/1998 |
|----|-----------|--------|
| JP | 11-252045 | 9/1999 |
| JP | 11-274976 | 10/1999 |
| JP | 2000-138605 | 5/2000 |

*Primary Examiner*—Mohammed Ghayour
*Assistant Examiner*—Erin M. File
(74) *Attorney, Agent, or Firm*—Oblon, Spivak, McClelland, Maier & Neustadt, P.C.

(57) ABSTRACT

Multi-beam demodulators for low-rate user signals and multi-beam interference canceller demodulators for high-rate user signals remove interference components from corresponding beam signals and output a soft decision value as the demodulation result. Adaptive beam demodulators for low-rate user signals and adaptive beam demodulators for high-rate user signals perform demodulation by using the beam signals from which the interference components has been removed and output a soft decision value as the demodulation result. The demodulators for the low-rate user signals select and output an optimal soft decision value based on the SIR estimate and the demodulators for the high-rate user signals select and output an optimal soft decision value based on the SIR estimate.

28 Claims, 17 Drawing Sheets

INTERFERENCE CANCELLER

TECHNICAL FIELD

The present invention relates to an interference canceller used in mobile communication, satellite communication, in-house communication, and the like. More specifically, the present invention relates to an interference canceller that removes interferences of other user signals from a received signal of each user signal among those corresponding to a plurality of users.

BACKGROUND ART

A conventional interference canceller will now be explained. As the conventional interference canceller, there is known, for example, "a multi-user receiver" explained in Japanese Patent Application Laid-open No. 2000-138605.

Operations of the conventional interference canceller in 2000-138605 will now be explained. FIG. 15 is block diagram of the conventional interference canceller, i.e., the multi-user receiver. The conventional interference canceller removes known multi-user time-space interferences from high-rate user signals. In addition, the conventional interference canceller removes interferences under antenna directivity control using signals (interference removal residual signals) obtained by removing high-rate user signals from received signals.

In a code division multiple access (CDMA) system that multiplexes user signals at a plurality of transmission rates, the number of high-rate user signals is small; however, the influence of the signals in terms of interference is great. Conversely, while the CDMA system is less influenced by low-rate user signals, the number of the low-rate user signals is large and a hardware scale is made large. Therefore, the conventional interference canceller omits a multi-user interference canceller operation for each low-rate user signal.

This conventional interference canceller receives CDMA signals at antennas 101-1 to 101-N (where N is a natural number) and outputs high-rate user signals to high-rate user IEUs (Interference Estimation Unit; hereinafter, simply "IEU") 103-1-1 to 103-1-K.

If the interference canceller consists of, for example, M stages of interference removal processing sections 102-1 to 102-M (where M is an integer equal to or greater than 2), IEU 103-1-1 to 103-M-K at each stage corresponding to the respective high-rate user signals receive interference removal residual signals for the respective antennas that are obtained by an interference removal processing at a previous stage and symbol replicas corresponding to the same user signals as those at the previous stage, and perform demodulation according to antenna directivities specific to the respective user signals. The IEU 103-1-1 to 103-M-K generate symbol replicas for the present stage and output the generated symbol replicas to the next stage.

At the same time, the IEU 103-1-1 to 103-M-K generate and output spread signals related to differences between the symbol replicas at the present stage and those at the previous stage for the respective antennas.

Delay units 105-1-1 to 105-(M-1)-N delay the received signals or interference processing residual signals for the respective antennas until processing results of the IEUs are output, respectively. Subtracters 106-1-1 to 106-1-(M-1)-N subtract outputs of the IEUs for the respective user signals from outputs of the delay units for the respective antennas, and obtain interference removal residual signals at the present stage for the respective antennas. The respective IEUs at a final stage output demodulated signals corresponding to the high-rate user signals.

Low-rate user DEMs (Demodulator Units: hereinafter, simply "DEM") 104-1 to 104-K receive the interference removal residual signals that are obtained by the interference removal processing at an (M-1) stage for the respective antennas, demodulate the received signals according to the antenna directivities specific to the user signals, and output demodulated signals corresponding to the low-rate user signals, respectively.

FIG. 16 is a block diagram of the IEU. The IEU performs a path-based processing corresponding to a multipath channel having a plurality of paths (#1 to #P).

Despreading sections 111-1 to 111-N receive the interference removal residual signals of the previous stage, and despread the received signals for the respective antennas. Multipliers 112-1 to 112-N give weights $W_1$ to $W_N$ to outputs of the respective despreading sections 111-1 to 111-N. An adder 113 synthesizes outputs of the multipliers 112-1 to 112-N. A multiplier 114 weights each symbol replica corresponding to the same user signal at the previous stage. An adder 115 adds up an output of the adder 113 and an output of the multiplier 114.

A detector 116 demodulates an output of the adder 115 using a channel estimate on each path. The detector 116 not only performs synchronized detection demodulation but also weighting for realizing maximum-ratio synthesis.

An adder 120 synthesizes outputs of the detector 116 for the respective paths. A decision unit 121 determines an output of the adder 120.

A multiplier 122 multiplies an output of the decision unit 121 by the channel estimate at each path to generate a symbol replica at the present stage, and outputs the generated symbol replica to the next stage. A subtracter 123 subtracts an output of the multiplier 114 from an output of the multiplier 122. A multiplier 124 weights an output of the subtracter 123. Multipliers 125-1 to 125-N multiply an output of the multiplier 124 by complex conjugate weights $W_1^*/N$ to $W_N^*/N$ that are obtained by normalizing the weights $W_1$ to $W_N$ by the number of antennas, respectively. Spreading sections 126-1 to 126-N spread outputs of the multipliers 125-1 to 125-N for the respective antennas.

Adders 127-1 to 127-N add up outputs of respective paths of the spreading sections 126-1 to 126-N for the respective antennas. The IEU 103-1-1 to 103-1-K at the initial stage receive, as the interference removal residual signals at the previous stage, the signals received at the antennas and employ 0 as the symbol replicas corresponding to the same users as those at the previous stage. Each of the IEU 103-M-1 to 103-M-K at the final stage outputs only the demodulated signal that is an output of the adders 120 and does not perform the following interference estimation processing and interference removal residual signal update processing. As the weights $W_1$ to $W_N$, steering antenna weights or adaptive control weights decided based on estimates of user signal arrival directions, respectively are used. Further, weighting factors of the multipliers 114 and 124 are, for example, $1-(1-\alpha)^{m-1}$ (where $\alpha$ is a real number equal to or smaller than 1 and m is the number of stages and an integer equal to or greater than 2 and equal to or smaller than M) and $\alpha$, respectively.

FIG. 17 is a block diagram of the DEM. The DEM performs a path-based processing corresponding to the multipath channel having a plurality of paths.

Despreading sections 131-1 to 131-N receive the interference removal residual signals obtained by the interference removal processings at the previous stage (M-1) for the respective antennas and despread the received interference removal residual signals for the respective antennas. Multipliers 132-1 to 132-N weight outputs of the respective despreading sections. An adder 133 synthesizes outputs of the respective multipliers 132-1 to 132-N. A detector 134 demodulates an output of the adder 133 using the path-based channel estimate. An adder 135 synthesizes outputs of the detector 134 for the respective paths and output a demodulated signal.

As explained above, the conventional interference canceller removes the interferences from user signals having high signal power using the antenna directivity control and the multi-user interference canceller. The conventional interference canceller removes the interferences from user signals having low signal power based only on the antenna directivity control, and thereby attains a large interference removal effect with the canceller or receiver that is relatively small in scale.

However, the conventional interference canceller has the following disadvantage. Since it takes long time to converge beam formation because of an algorithm of an adaptive array antenna, the conventional interference canceller cannot deal with reception of a signal having a short time length such as a packet signal or a random access channel (hereinafter, "RACH") signal.

The conventional interference canceller also has the following disadvantage. As the number of stages (the number of times of replica signal subtraction) of the interference canceller increases, signal-to-interference ratio (hereinafter, "SIR") of the received signals improves. However, the demodulation processings up to the final stage are disadvantageously, greatly delayed. To be specific, this delay makes it impossible to deal with high-rate transmit power control (hereinafter, "TPC") and characteristics of the canceller are disadvantageously, greatly deteriorated, depending on a change rate of fading.

It is an object of the present invention to solve at least the problems in the conventional technology.

DISCLOSURE OF THE INVENTION

An interference canceller according to one aspect of the present invention comprises: a multi-beam forming unit (corresponding to antennas 1-1 to 1-N, auto gain controls (hereinafter, "AGC") 2-1 to 2-N, quasi-synchronized detection sections 3-1 to 3-N, A/Ds 4-1 to 4-N, and a multi-beam forming unit 5 in embodiments explained later) that forms B beams each having a fixed directivity using N antenna element-based signals, and that outputs beam-based signals; a user specific multi-beam demodulation unit (corresponding to low-rate user multi-beam demodulators 6-1 to 6-$N_L$ and high-rate user multi-beam interference canceller demodulators 7-1 to 7-$N_H$) that generates pieces of path position information corresponding to P effective paths detected using the beam-based signals, respectively, and that generates a first beam-synthesized signal (a soft decision value), the first beam-synthesized signal obtained by synthesizing the beam-based signals, from which interferences are removed, respectively, using the beam-based signals and the path position information; a user specific high-rate user replica generation unit (corresponding to the high-rate user multi-beam interference canceller demodulators 7-1 to 7-$N_H$) that generates beam-based replica signals and symbol replicas using the respective pieces of path position information, the first beam-synthesized signal, and a channel estimate calculated for each of the paths when generating the first beam-synthesized signal; an interference component removal unit (corresponding to subtracters 11-1 to 11-B) that subtracts corresponding beam-based replica signals from the beam-based signals delayed by as much as times required for processings for generating the beam-based replica signals, respectively, and that removes interference components caused by high-rate users; and a user specific low-rate user adaptive beam demodulation unit (corresponding to low-rate user adaptive beam demodulators 12-1 to 12-$N_L$) that generates adaptive beams by conducting path-based weight control to the interference component-removed beam-based signals, and that then synthesizes adaptive-beam-formed signals for the respective paths to generate a first adaptive-beam-synthesized signal (a soft decision value).

The interference canceller according to another aspect of the invention comprises a first selection unit (corresponding to a soft decision data selection section 14) that adaptively selects and outputs one of the first beam-synthesized signal and the first adaptive-beam-synthesized signal using a predetermined standard.

The interference canceller according to still another aspect of the invention comprises a first SIR correction unit (corresponding to an SIR correction section 13) that calculates a first SIR estimate using the known sequence per slot included in each of the beam-based signals and the path position information and calculates, on the other hand, a second SIR estimate based on the adaptive-beam-formed signals in the low-rate user adaptive beam demodulation units, that compares the first SIR estimate with the second SIR estimate, and that adaptively corrects an SIR value based on a comparison result.

The interference canceller according to still another aspect of the invention comprises a user specific high-rate user adaptive beam demodulation unit (corresponding to high-rate user adaptive beam demodulators 15-1 to 15-$N_H$) that individually adds the beam-based symbol replicas to the interference component-removed, beam-based signals and conducts path-based weight control to addition results to thereby form adaptive beams, and that then synthesizes path-based adaptive-beam-formed signals to thereby generate a second adaptive-beam-synthesized signal (a second adaptive-beam-synthesized soft decision value).

The interference canceller according to still another aspect of the invention comprises a second selection unit (corresponding to a soft decision data selection section 17) that adaptively selects and outputs one of the first beam-synthesized signal and the second adaptive-beam-synthesized signal using a predetermined standard.

The interference canceller according to still another aspect of the invention comprises a second SIR correction unit (corresponding to an SIR correction section 16) that calculates a third SIR estimate using the known sequence per slot included in each of the beam-based signals and the path position information and calculates, on the other hand, a fourth SIR estimate based on the adaptive-beam-formed signals in the high-rate user adaptive beam demodulation unit, that compares the third SIR estimate with the fourth SIR estimate, and that adaptively corrects an SIR value based on a comparison result.

An interference canceller according to one aspect of the present invention includes a multi-beam forming unit that forms B beams using signals received from N antenna elements, wherein directivity of each beam is fixed, and outputs beam signals corresponding to the respective B beams; a multi-beam demodulation unit that detects P paths using the beam signals, generates path position information corresponding to the paths, removes interference from each of the beam signals by calculating a channel estimate for each of the paths using the path position information, and synthesizes the beam signals from which the interference has been removed to generate a first beam-synthesized signal; a high-rate replica generation unit that generates a replica signal and a symbol replica, for each of the beam signals using the path position information, the first beam-synthesized signal, and the channel estimate; a delay unit that delays each of the beam signals for a processing time to generate the replica signal in the high-rate user replica generation unit; an interference component removal unit that subtracts the replica signal from the corresponding beam signal delayed to remove interference components caused by a high-rate user signal from the beam signal; and a low-rate adaptive beam demodulation unit that generates adaptive beams by performing a weight control to the beam signals from which the interference components have been removed for each of the paths, and synthesizes adaptive beam signals corresponding to the respective adaptive beams to generate a first adaptive-beam-synthesized signal.

An interference canceller according to another aspect of the present invention includes a multi-beam forming unit that forms B beams using antenna-based signals corresponding to respective signals received from N antenna elements, wherein directivity of each beam is fixed, and outputs beam signals corresponding to the respective B beams; a multi-beam demodulation unit that detects P paths using the beam signals, generates path position information corresponding to the paths, removes interference from each of the beam signals by calculating a channel estimate for each of the paths using the path position information, and synthesizes the beam signals from which the interference has been removed to generate a first beam-synthesized signal; a high-rate replica generation unit that generates a replica signal and a symbol replica, for each of the beam signals using the path position information, the first beam-synthesized signal, and the channel estimate; an inverse beam forming unit that performs inverse beam forming to the beam replica signal and the beam symbol replica to generate N inverse-beam-formed replica signals and B×P inverse-beam-formed symbol replicas; a delay unit that delays each of the antenna-based signals for a processing time to generate the corresponding inverse-beam-formed replica signal in the inverse beam forming unit; an interference component removal unit that subtracts the inverse-beam-formed replica signal from the corresponding antenna-based signal delayed to remove interference components caused by a high-rate user signal from the antenna-based signal; and a low-rate adaptive antenna demodulation unit that generates adaptive beams by performing a weight control to the antenna-based signals from which the interference components have been removed for each of the paths, and synthesizes adaptive beam signals corresponding to the respective adaptive beams to generate a second beam-synthesized signal.

The other objects, features and advantages of the present invention are specifically set forth in or will become apparent from the following detailed descriptions of the invention when read in conjunction with the accompanying drawings.

BEST MODE FOR CARRYING OUT THE INVENTION

Exemplary embodiments of an interference canceller according to the present invention will be explained hereinafter in detail with reference to the drawings. It should be noted that the embodiments are not intended to limit the invention.

Figure 1:
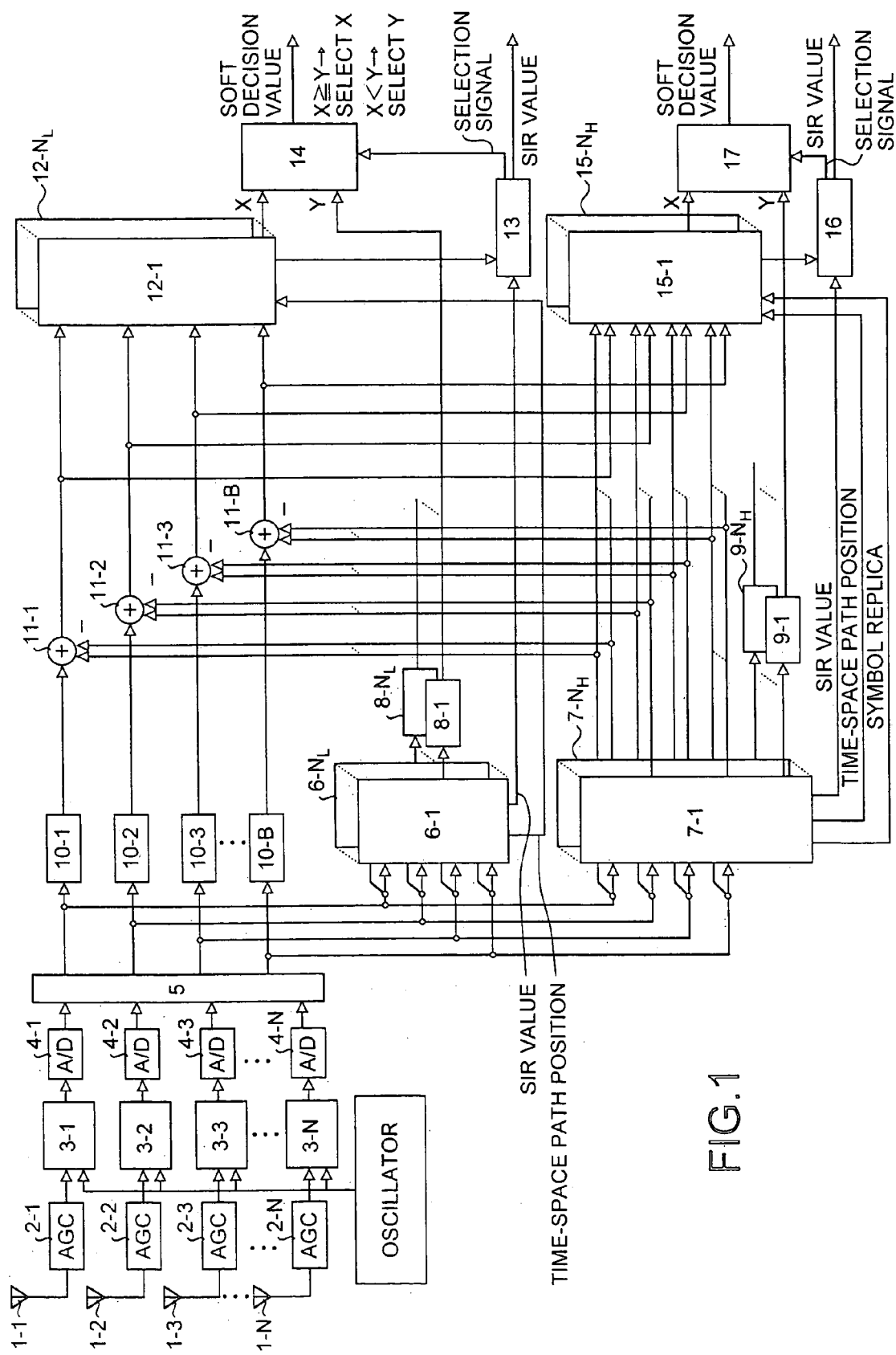
FIG. 1 is a block diagram of a first embodiment of an interference canceller according to the present invention.

FIG. 1 is a block diagram of a first embodiment of the interference canceller according to the present invention. In FIG. 1, reference symbols 1-1, 1-2, 1-3, . . . , and 1-N denote antennas, 2-1, 2-2, 2-3, . . . , and 2-N AGCs, 3-1, 3-2, 3-3, . . . , and 3-N quasi-synchronized detection sections, 4-1, 4-2, 4-3, . . . , and 4-N AIDs (analog-to-digital conversion sections), 5 a multi-beam forming section, 6-1, . . . , and 6-$N_L$ low-rate user multi-beam demodulators (LRUMB-DEM), 7-1, . . . , and 7-$N_H$ high-rate user multi-beam interference canceller demodulators (HRUMBICDEM), 8-1, . . . , 8-$N_L$, 9-1, . . . , 9-$N_H$, 10-1, 10-2, 10-3, . . . , and 10-B delay units, 11-1, 11-2, 11-3, . . . , and 11-B subtracters, 12-1, . . . , and 12-$N_L$ low-rate user adaptive beam demodulators (LRUABDEM), 13 and 16 SIR correction sections, 14 and 17 soft decision data selection sections, and 15-1, . . . , and 15-$N_H$ high-rate user adaptive beam demodulators (HRUABDEM).

Characteristic operations of the interference canceller in this embodiment will now be explained. The multi-beam forming section 5 that receives antenna signals #1 to #N which have been subjected to auto gain control, quasi-synchronized detection, and A/D conversion processing forms B multi-beams (where multi-beams are beams each having a fixed directivity).

Figure 2:
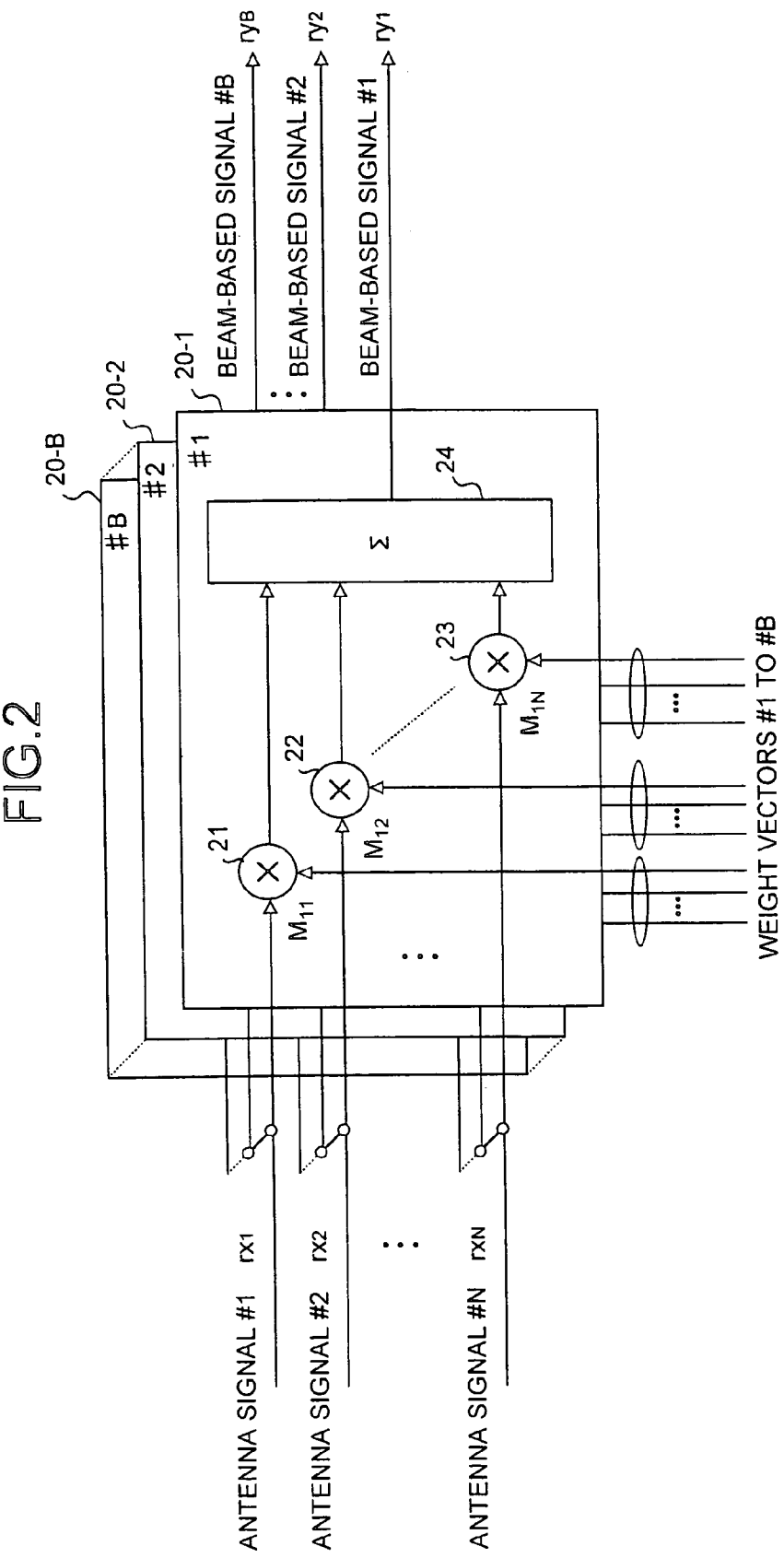
FIG. 2 is a block diagram of a multi-beam forming section 5.
Figure 3:
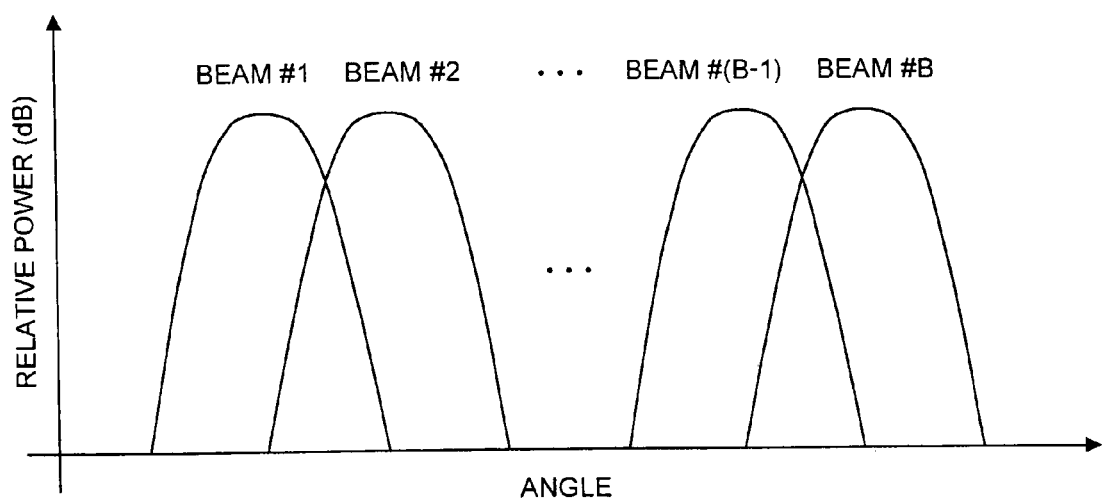
FIG. 3 is a graph of B multi-beams.

FIG. 2 is a block diagram of the multi-beam forming section 5. In FIG. 2, reference symbols 20-1, 20-2, . . . , and 20-B denote multi-beam formation sections, 21, 22, and 23 multipliers, and 24 a synthesis section. By way of example, the multi-beam forming section 5 forms multi-beams using the antenna signals which are not despread yet. FIG. 3 is a graph indicating multi-beams.

In the multi-beam forming section 5, N antenna signals rx are given as rx=[$rx_1$, $rx_2$, . . . , $rx_N$]$^T$ if the signals are expressed by a vector (in which respective elements are complex numbers). Symbol T denotes a transpose. In addition, weight vectors for forming beam-based signals #1 to #B are given as $M_1=[M_{11}, M_{12}, \ldots, M_{1N}]^T$, $M_2=[M_{21}, M_{22}, \ldots, M_{2N}]^T, \ldots$, and $M_B=[M_{B1}, M_{B2}, \ldots, M_{BN}]^T$, respectively (where respective elements are complex numbers). Therefore, these weight vectors can be expressed by a matrix as shown in the following Equation (1).

$$M = \begin{bmatrix} M_{11} & M_{12} & \cdots & M_{1N} \\ M_{21} & M_{22} & \cdots & M_{2N} \\ \vdots & \vdots & & \vdots \\ M_{B1} & M_{B2} & \cdots & M_{BN} \end{bmatrix} \quad (1)$$

B beam-based signals ry after the formation of the multi-beams are given as $ry=[ry_1, ry_2, \ldots, ry_B]^T$ if they are expressed as a vector (where respective elements are complex numbers) as shown in the following Equation (2).

$$ry=M \cdot rx \quad (2)$$

The beam-based signals #1 to #B output from the multi-beam forming section 5 are output to the delay units 10-1 to 10-B, the low-rate user multi-beam demodulators 6-1 to 6-$N_L$, and the high-rate user multi-beam interference canceller demodulators 7-1 to 7-$N_H$.

Figure 4:
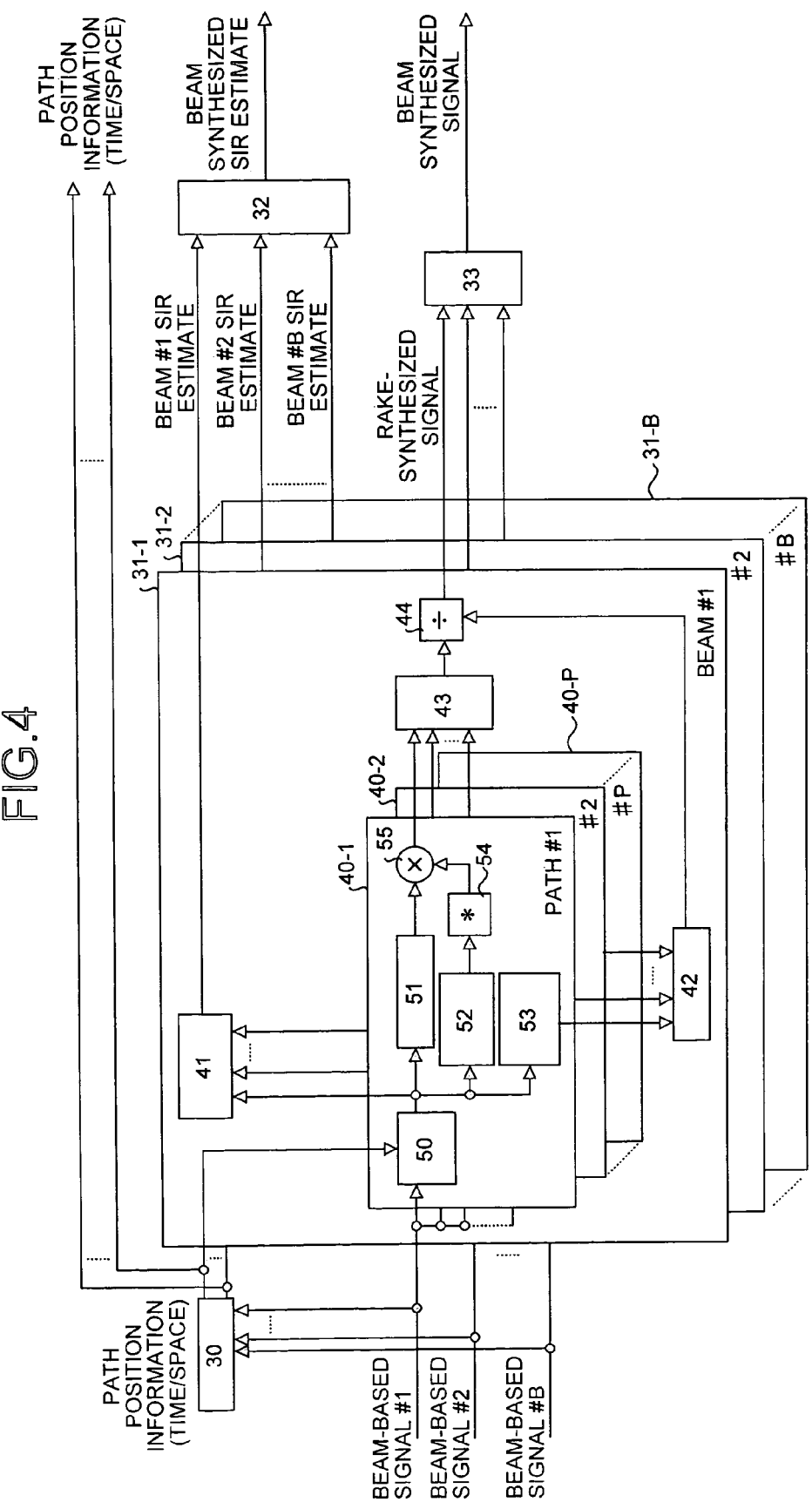
FIG. 4 is a block diagram of low-rate user multi-beam demodulators.

Operations of the low-rate user multi-beam demodulators (LRUMBDEM) 6-1 to 6-$N_L$ will next be explained. FIG. 4 is a block diagram of the low-rate user multi-beam demodulators (LRUMBDEM) 6-1 to 6-$N_L$. In FIG. 4, reference symbol 30 denotes a path detector, 31-1, 31-2, ..., and 31-B beam-based RAKE synthesized signal generation sections, 32 and 33 synthesis sections, 40-1, 40-2, ..., and 40-P path-based detection/interference power estimate sections, 41 an SIR estimate section, 42 an averaging section, 43 a synthesis section, 44 a division section, 50 a despreading section, 51 a delay unit, 52 a channel estimate section, 53 an interference power estimate section, 54 a complex conjugate calculation section, and 55 a complex multiplier. Since the low-rate user multi-beam demodulation sections are equal in configuration, the operations will be explained using the configuration of the low-rate user multi-beam demodulation section 6-1.

Figure 5:
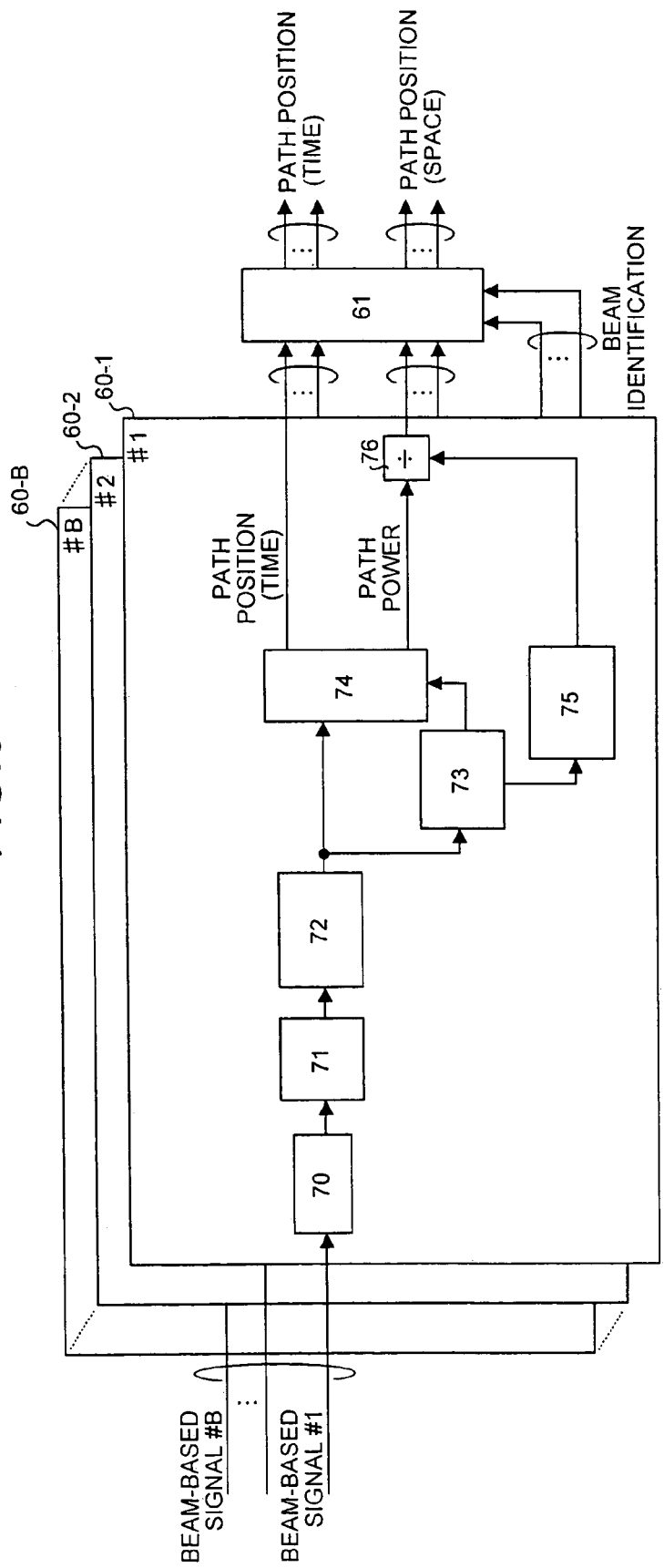
FIG. 5 is a block diagram of a path detection section.

With the received beam-based signals #1 to #B after multi-beam formation, the low-rate user multi-beam demodulation section 6-1 detects paths in a time space. FIG. 5 is a block diagram of the path detection section 30. In FIG. 5, reference symbols 60-1, 60-2, ..., and 60-B denote beam-based path detection sections, 61 a path selection section, 70 a despreading section, 71 a channel estimate section, 72 an average power calculation section, 73 a threshold calculation section, 74 a decision section, 75 an interference power calculation section, and 76 a divider. The path detection section 30 selects P paths different in time from despread signals that are influenced by a multipath wave using the B beam-based signals. Since the beam-based path detection sections are equal in configuration, operations thereof will be explained using the configuration of the beam-based path detection section 60-1.

In the beam-based path detection section 60-1, the despreading section 70 despreads the beam-based signal #1. The channel estimate section 71 performs a common mode addition to all symbols in one slot using a pilot symbol that is a known sequence provided per slot (see the slot configuration shown in FIG. 6), and obtains a spontaneous channel estimate.

The average power calculation section 72 performs a power averaging processing over several slots using the channel estimate obtained by the channel estimate section 71, and calculates an average power delay profile. The threshold calculation section 73 sets a power higher by A decibels than a lowest path power in the average power delay profile as a path select threshold. The interference power calculation section 75 regards a path power equal to or lower than the threshold in the average power delay profile as a noise/interference power, and calculates the interference power. The decision section 74 compares an output of the average power calculation section 72 (the average power delay profile) with an output of the threshold calculation section 73 (the threshold), and decides that a path having a higher average power than the threshold is a path that corresponds to a desired signal. The decision section 74 then outputs information on a time-based position of this path (a beamidentification number).

Further, the decision section inputs a path power of the path that corresponds to the desired signal to the divider 76. The divider 75 performs a division for normalization using the interference power, and outputs a division result. Normally, the path detection section 30 often performs a signal processing only to the preset P paths because of hardware or software restrictions to a receiver side. Therefore, the path selection section 61 selects P paths in descending order of the average powers of normalized paths so as to be able to select P effective paths. The path selection section 61 outputs, as path position information, time/space positions corresponding to the respective selected paths.

As explained above, the path detection section 30 estimates path arriving directions by a simple method of spatially separating paths using the multi-beams, and normalizes the paths using an interference power for each beam. As a result, the path detection section 30 can reduce the influence of an interference wave (can improve the SIR) and, therefore, improve a path detection accuracy. Further, by forming multi-beams in all sectors, it is possible to do a cell omnidirectional path search (do a path search without a consideration to a concept of sectors) at a base station which may possibly receive a signal from one user at a plurality of sectors (at which a plurality of paths arrive at angles in a wide range). In addition, it is possible to facilitate the demodulation processing since fixed multi-beams are common to all users.

The beam-based RAKE synthesized signal generation sections 31-1 to 31-B generates RAKE synthesized signals for the respective beams. Since the beam-based RAKE synthesized signal generation sections are equal in configuration, operations thereof will be explained using the configuration of the beam-based RAKE synthesized signal generation section 31-1.

The despreading section 50 provided per path despreads the received time/space path position information for each of the paths (paths #1 to #P). The despread signal is output to the SIR estimate section 41 as well as the delay unit 51, the channel estimate section 52, and the interference power estimate section 53 that are provided for each path.

Figure 6:
FIG. 6 is a known sequence provided per slot.

The channel estimate section 52 corresponding to, for example, the path #1 calculates a channel estimate of the path #1 using the slot-based pilot symbol shown in FIG. 6. The complex conjugate calculation section 54 corresponding to the path #1 calculates a complex conjugate of the channel estimate. The complex multiplier 55 corresponding to the path #1 multiplies the complex conjugate by a despread signal delayed by a predetermined time by the delay unit 51, and outputs a signal for the path #1 which is given a weight proportional to a signal amplitude and from which a phase change is removed. Similarly, signals for the paths #2 to #P are output. The synthesis section 43 synthesizes all the signals for the paths #1 to #P at the same timing.

The interference power estimate section 53, which corresponds to the path #1 and receives the despread signal, calculates an interference power from the despread signal $y_{1,1}(k_s, j)$ corresponding to the path #1 for the beam #1 (where $y_{a,b}(k_s, j)$ is a complex number, a is a beam #a, b is a path #b, $k_s$ is a slot, and j is a j-th pilot symbol in a $k_s$-th slot). The interference power estimate section 53, first, removes a demodulation component of a pilot symbol $P_s(k_s, j)$ (where $|P_s(k_s, i)|=1$) in a $k_s$ slot, performs a common mode addition to all symbols, and calculates a channel estimate $\eta_{1,1}(k_s)$ (where $\eta_{1,1}(k_s)$ is a complex number) for the $k_s^{th}$ slot of the path #1 for the beam #1. The interference power estimate section 53, next, calculates an interference power $\sigma1,1^2(k_s)$ (where $\sigma_{a,b}^2(k_s)$ is a complex number) of the $k_s$-th slot corresponding to the path #1 for the beam #1 according to Equation (3).

$$\sigma_{1,1}^2(k_S) = \frac{1}{P}\sum_{j=1}^{P} |y_{1,1}(k_s, j) \cdot P_S^*(k_S, j) - \eta_{1,1}(k_S)|^2 \quad (3)$$

In Equation (3), $P_s^*(k_s, j)$ is a complex conjugate of $P_s(k_s, j)$ and $P_s$ is the number of pilot symbols in one slot.

Further, the interference power estimate section 53 performs an averaging processing over a plurality of slots using the obtained interference power $\sigma_{1,1}^2(k_s)$ of the $k_s$-th slot according to Equation (4). In this example, the interference power estimate section 53 calculates an interference power estimate $1_{1,1}(k_s)$ of the $k_s$-th slot on the path #1 for the beam #1 is calculated.

$$I_{1,1}(k_S) = \frac{1}{S}\sum_{l=0}^{S-1} \sigma_{1,1}^2(k_S - S) \quad (4)$$

In Equation (4), S is the number of slots used for averaging.

The interference power obtained according to Equation (4) is calculated for each of the paths #2 to #P for the beam #1 similarly to the path #1 for the beam #1. The averaging section 42 averages the interference powers according to Equation (5) and calculates an average interference power corresponding to the beam #1.

$$I_1(k_S) = \frac{1}{LI}\sum_{b=1}^{LI} I_{1,b}(k_S) \quad (5)$$

The division (normalization) section 44 divides a synthesized signal output from the synthesis section 43 by the received average interference power of the beam #1, and generates and outputs a RAKE synthesized signal that corresponds to the beam #1 normalized by the interference power. RAKE synthesized signals for the beams #2 to #B are calculated similarly to that for the beam #1.

The synthesis section 33 synthesizes RAKE synthesized signals corresponding to all the beams, and generates and outputs a beam synthesized signal. This beam synthesized signal is output, as a soft decision value, to the delay units 8-1 to 8-$N_L$ shown in FIG. 1.

The SIR estimate section 41 corresponding to the beam #1 calculates a signal power-to-interference power ratio that corresponds to the beam #1. Specifically, the SIR estimate section 41 calculates an interference power by processings similar to those according to the Equations (3), (4), and (5) for estimating the interference power of each beam.

To estimate a signal component from, for example, a despread signal $y_{1,1}(k_s, j)$ corresponding to the path #1 for the beam #1, the SIR estimate section 41 removes a demodulation component of the pilot symbol $P_s(k_s, j)$ in the $k_s$-th slot, performs a common mode addition to all symbols, and calculates a channel estimate $\eta_{1,1}(k_s)$ for the $k_s$-th slot on the path #1 for the beam #1. The SIR estimate section 41 calculates a power using the channel estimate according to Equation (6), and thereby calculates a signal power of the path #1 for the beam #1 in the $k_s$-th slot.

$$S_{1,1}(k_S) = |\eta_{1,1}(k_S)|^2 \quad (6)$$

Likewise, powers of the paths #2 to #P for the beam #1 in the $k_s$-th slot are calculated. The SIR estimate section 41 calculates a signal power of the beam #1 in the $k_s$-th slot according to Equation (7).

$$S_1(k_S) = \sum_{b=1}^{LI} |\eta_{1,b}(ks)|^2 \quad (7)$$

Further, as shown in Equation (8), the SIR estimate section 41 divides Equation (5) by Equation (7), and calculates an SIR estimate of the beam #1 in the $k_s$-th slot. Using the same procedures as those for the beam #1, the SIR estimate section 41 calculates SIR estimates of the beams #2 to #B.

$$SIR_1(k_S) = \frac{S_1(ks)}{I_1(ks)} \quad (8)$$

Finally, the synthesis section 32 synthesizes all the SIR estimates calculated for the beams #1 to #B, and generates and outputs a beam synthesized SIR estimate.

Figure 7:
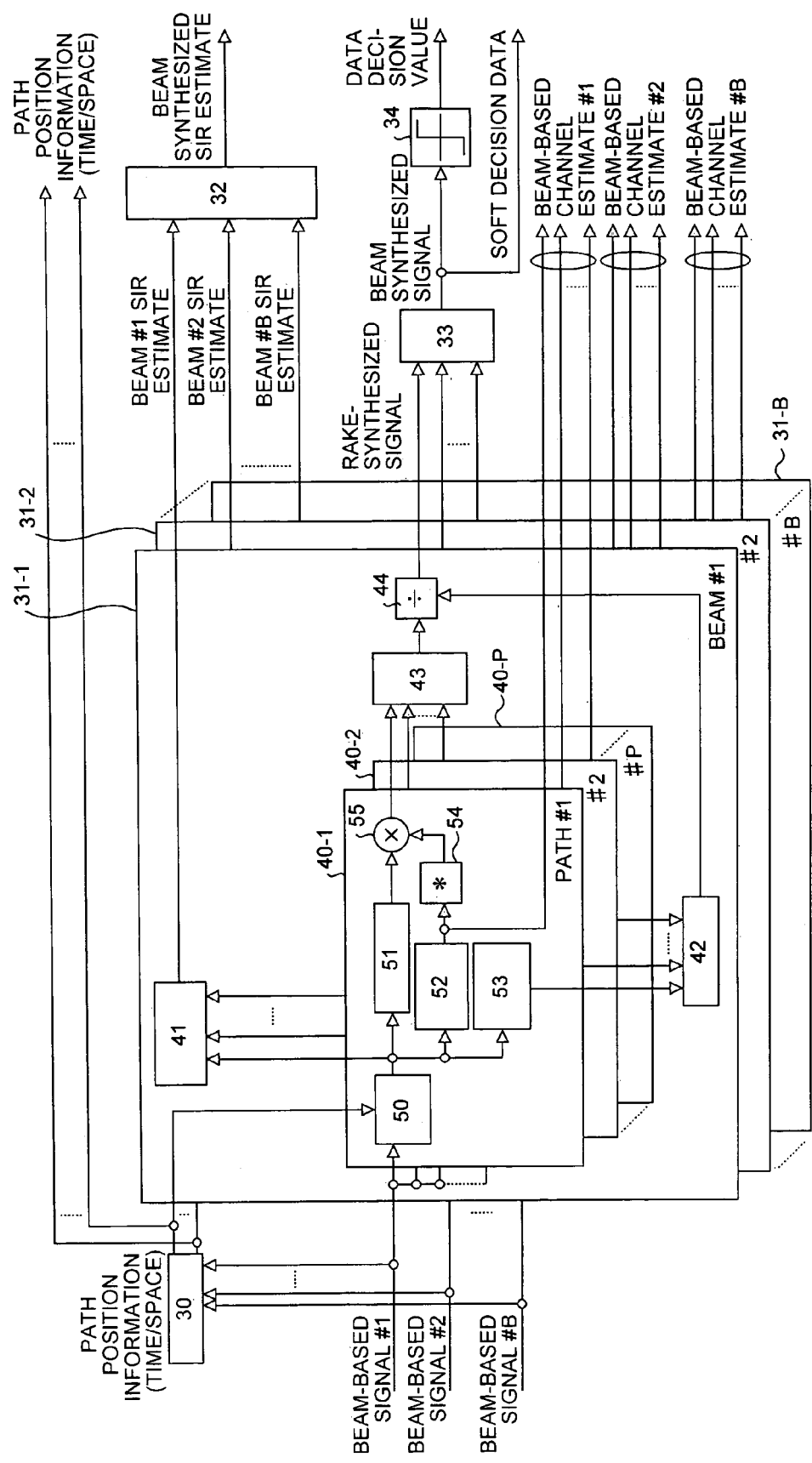
FIG. 7 is a block diagram of high-rate user multi-beam interference canceller demodulators.
Figure 8:
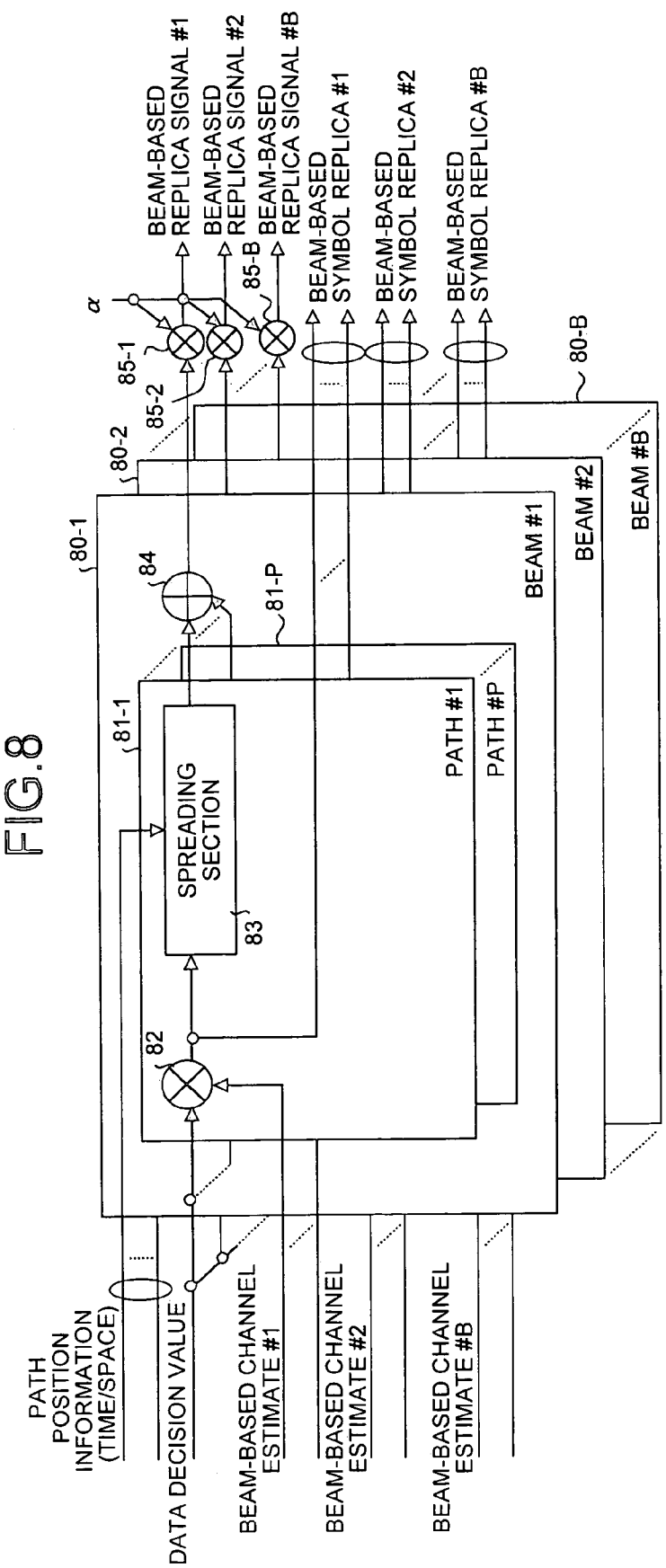
FIG. 8 is a block diagram of the high-rate user multi-beam interference canceller demodulators.

Operation of the high-rate user multi-beam interference canceller demodulators (HRUMBICDEM) 7-1 to 7-$N_H$ will next be explained. FIGS. 7 and 8 are block diagrams of the high-rate user multi-beam interference canceller demodulators 7-1 to 7-$N_H$. In FIG. 7, reference symbol 34 denotes a decision section. It is noted that the same constituent elements as those of the low-rate user multi-beam demodulators 6-1 to 6-$N_L$ are denoted by the same reference symbols, respectively and will not be explained herein. In addition, in FIG. 8 (in a replica generation section in the high-rate user multi-beam interference canceller demodulators), reference symbols 80-1, 80-2, . . . , and 80-B denote beam-based replica generation sections, 82 a multiplier, 83 a spreading section, and 84 a synthesizer, 85-1 to 85-B multipliers. Since the high-rate user multi-beam interference canceller demodulators are equal in configuration, the operations will be explained herein using the configuration of the high-rate user multi-beam interference canceller demodulator 7-1.

The high-rate user multi-beam interference canceller demodulator 7-1 is basically equal in configuration to the low-rate user multi-beam demodulators. However, the high-rate user multi-beam interference canceller demodulator 7-1 differs from the low-rate user multi-beam demodulators in that B beam-based RAKE synthesized signal generation sections output beam-based channel estimates (outputs of the channel estimate sections 52) that correspond to the respective paths (P paths), a decision section 34 that temporarily determines the beam synthesized signal is provided, and in that the replica generation section shown in FIG. 8 is provided.

The different operations of the high-rate user multi-beam interference canceller demodulators from those of the low-rate user multi-beam demodulators will be explained herein. The decision section 34, first, calculates a data decision value necessary to generate a replica signal, i.e., a hard decision value (e.g., +1 or −1). The decision section 34 outputs the beam synthesized signal, as a soft decision value, to the delay units 9-1 to 9-$N_H$ shown in FIG. 1.

As explained below, the replica generation section shown in FIG. 8 generates a beam-based replica signal. Since the B beam-based replica generation sections are equal in configuration, the operations will be explained using the configuration of the beam-based replica generation section 80-1.

In the beam-based replica generation section 80-1, first, the multiplier 82 multiplies the P beam-based channel estimates by the data decision value for each of the P paths detected for the beam #1. The multiplication result is output to each of the paths (P paths) in the beam #1 as a symbol replica (beam-based symbol replicas #1 to #B).

The spreading section 83 that receives the multiplication result obtained for each path sets a spreading timing for each path, and spreads the multiplication result based on the path position information (time/space) obtained from the path detection section 30. The synthesis section 84 synthesized spreading results that correspond to the P paths. Using the same procedures as those for the beam #1, the synthesis result for each of the beams #2 to #B is calculated.

The multipliers 85-1 to 85-B multiply beam-based synthesis results by a factor of α (0<α≦1) and generate beam-based replica signals #1 to #B, respectively.

Effects obtained when the low-rate user multi-beam demodulators 6-1 to 6-$N_L$ and the high-rate user multi-beam interference canceller demodulators 7-1 to 7-$N_H$ are employed will be explained.

Since the canceller receives signals in the form of the fixed multi-beams, the canceller does not require a long time to converge beam formation as compared with the conventional art in which the algorithm of the adaptive array antenna is employed. Therefore, a reception SIR value can be improved. In addition, since there is a probability that interference power differs among the multi-beams, the beam-based RAKE synthesized signals are normalized using the interference power estimated as the pilot symbol. Therefore, the canceller can easily deal with reception of a signal having a length close to a sloth length and having a small time length such as a packet signal or a RACH signal.

For the detected paths, it is necessary to take account of the interference power of the detected beam (space position). Therefore, the detected paths are normalized for each path using the interference power in the fixed beam. As a result, the path-based SIR value is calculated. The path-based SIR values are synthesized for each user (synthesized into a kind of a maximum ratio in consideration of even the interference power), thereby calculating a transmit power control SIR value. As a result, it is possible to calculate the transmit power SIR value in consideration of even the difference in interference power among the beams.

In order to consider a tracking characteristic due to a fading change of the high-rate TPC, the SIR value is corrected (by an SIR correction section 16 to be explained later) by as much as an improvement made by the interference canceller using the SIR values calculated from the signals which are not subjected to interference canceling yet) (which SIR values are generated by the low-rate user multi-beam demodulators and the high-rate user multi-beam interference canceller demodulators) and the SIR values calculated from the signals which are subjected to the interference canceling (which SIR values are generated by low-rate user adaptive beam demodulators and high-rate user adaptive beam demodulators to be explained later). It is thereby possible to facilitate dealing with the high-rate TPC (Transmit Power Control).

The subtracters 11-1, 11-2, . . . , and 11-B receive the beam-based signals #1 to #B delayed by the delay units 10-1 to 10-B and the beam-based replica signals #1 to #B generated by the high-rate user multi-beam interference canceller demodulators, respectively. The subtracters subtract the corresponding beam-based replica signals #1 to #B from the beam-based signals #1 to #B, thereby removing interference components caused by high-rate users.

The beam-based signals #1 to #B from which the interference components are removed are output to the low-rate user adaptive beam demodulators 12-1 to 12-$N_L$ and the high-rate user adaptive beam demodulators 15-1 to 15-$N_H$.

Figure 9:
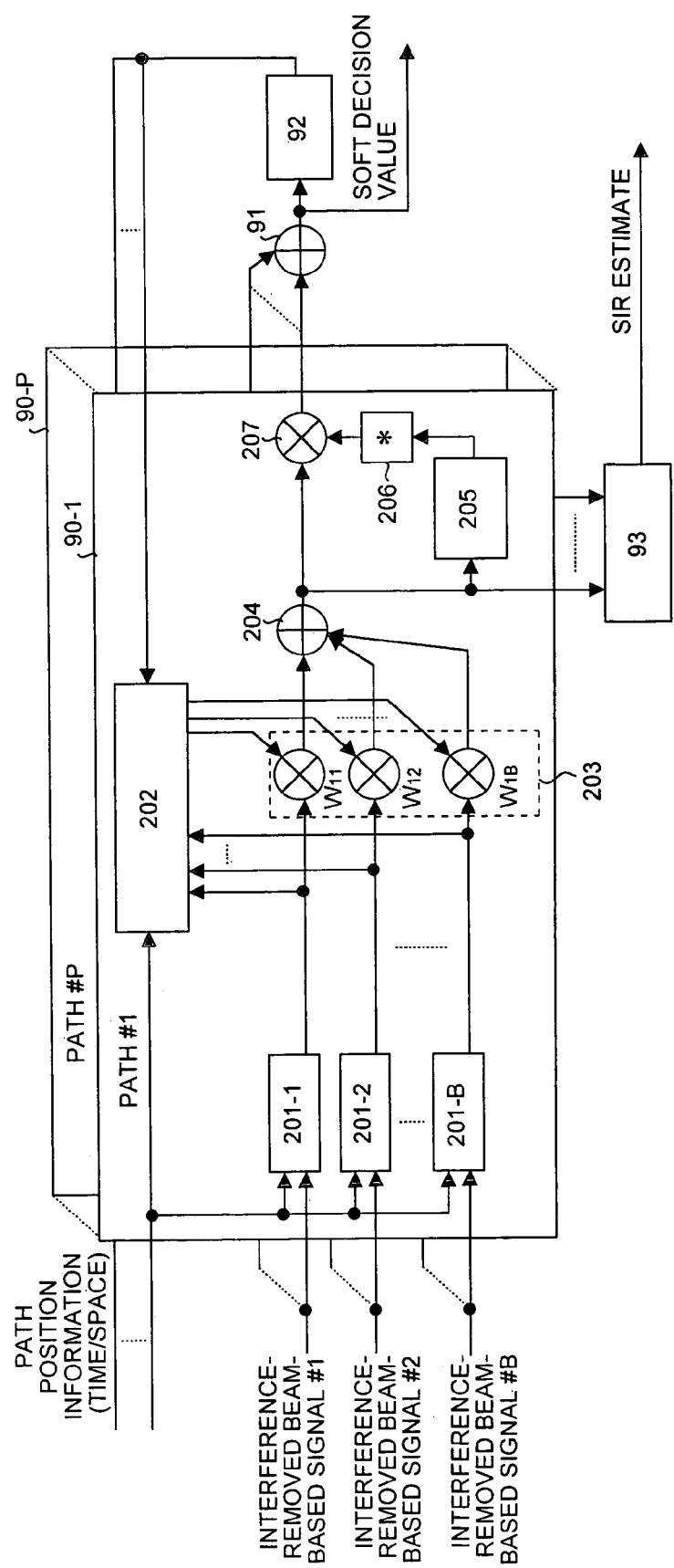
FIG. 9 is a block diagram of low-rate user adaptive beam demodulators.

Operations of the low-rate user adaptive beam demodulators (LRUABDEM) 12-1 to 12-NL will next be explained. FIG. 9 is a block diagram of the low-rate user adaptive beam demodulators 12-1 to 12-NL. In FIG. 9, reference symbols 90-1 to 90-P denote path-based fading compensation sections, 91 a synthesizer, 92 a decision section, 93 an SIR estimate section, 201-1, 201-2, . . . , and 201-B despreading sections, 202 a weight generation section, 203 a multiplier, 204 a synthesizer, 205 a channel estimate section, 206 a complex conjugate calculation section, and 207 a multiplier. Since the low-rate user adaptive beam demodulators are equal in configuration, the operations thereof will be explained using the configuration of the low-rate user adaptive beam demodulator 12-1.

The low-rate user adaptive beam demodulator 12-1 receives the interference-removed beam-based signals #1 to #B from the subtracters 11-1 to 11-B, respectively. In addition, the low-rate user adaptive beam demodulator 12-1 receives the path position information (time/space) from the path detection section 30 of the low-rate user multi-beam demodulator 6-1. Since the path-based fading compensation sections are equal in configuration, the operations will be explained using the configuration of the path-based fading compensation section 90-1. It is assumed that the path-based fading compensation section 90-1 deals with paths equal in detected time-based positions for the B beams as equal paths.

In the path-based fading compensation section 90-1, the despreading sections 201-1 to 201-B that correspond to the path #1 despread the interference-removed beam-based signals at a timing obtained from the path position information for the respective beams.

The weight generation section 202 that corresponds to the path #1 receives the path position information, the beam-based despread signals, and a decision value after adaptive beam formation to be explained later, and calculates a weight according to an MMSE-standard algorithm such as LMS, RLS, or SMI. As an initial value of the weight, a result of an addition of weights of a plurality of fixed multi-beams is set since the path equal in time-based position is received in the form of a plurality of fixed multi-beams (to thereby make it possible to accelerate algorithm convergence for beam formation).

The multiplier 203 that corresponds to the path #1 multiplies, for example, a weight vector $W_1=[w_{11}, w_{12}, \ldots, w^{1B}]^T$ for the path #1 generated by the weight generation section 202 (note, in an element $w_{ij}$ of the weight vector, i represents a path number and j represents a beam number) by the despread signals, respectively.

The synthesizer 204 that corresponds to the path #1 synthesizes the multiplication results, and generates a adaptive-beam-formed signal corresponding to the path #1. This adaptive-beam-formed signal is output to the channel estimate section 205 and the SIR estimate section 93. Since operations of the channel estimate section 205, the complex conjugate calculation section 206, and the SIR estimate section 93 are equal in those of the channel estimate section 52, the complex conjugate calculation section 54, and the SIR estimate section 41, respectively, they will not be explained herein.

The multiplier 207 that corresponds to the path #1 multiplies the adaptive-beam-formed signal by a complex conjugate calculated by the complex conjugate calculation section 206, thereby compensating fading. Using the same procedures as those for the path #1, fading-compensated, adaptive-beam-formed signals are calculated for the paths #2 to #P.

The synthesizer 91 synthesizes the P fading-compensated, adaptive-beam-formed signals and outputs a soft decision result as a synthesis result. Finally, the decision section 92 makes a soft decision for weight generation based on the soft decision value.

As explained above, the low-rate user adaptive beam demodulators receive only the beam-based signals after removing the interferences caused by the high-rate users, i.e., only the low-rate user signals, so that a demodulation accuracy can be improved.

Figure 10:
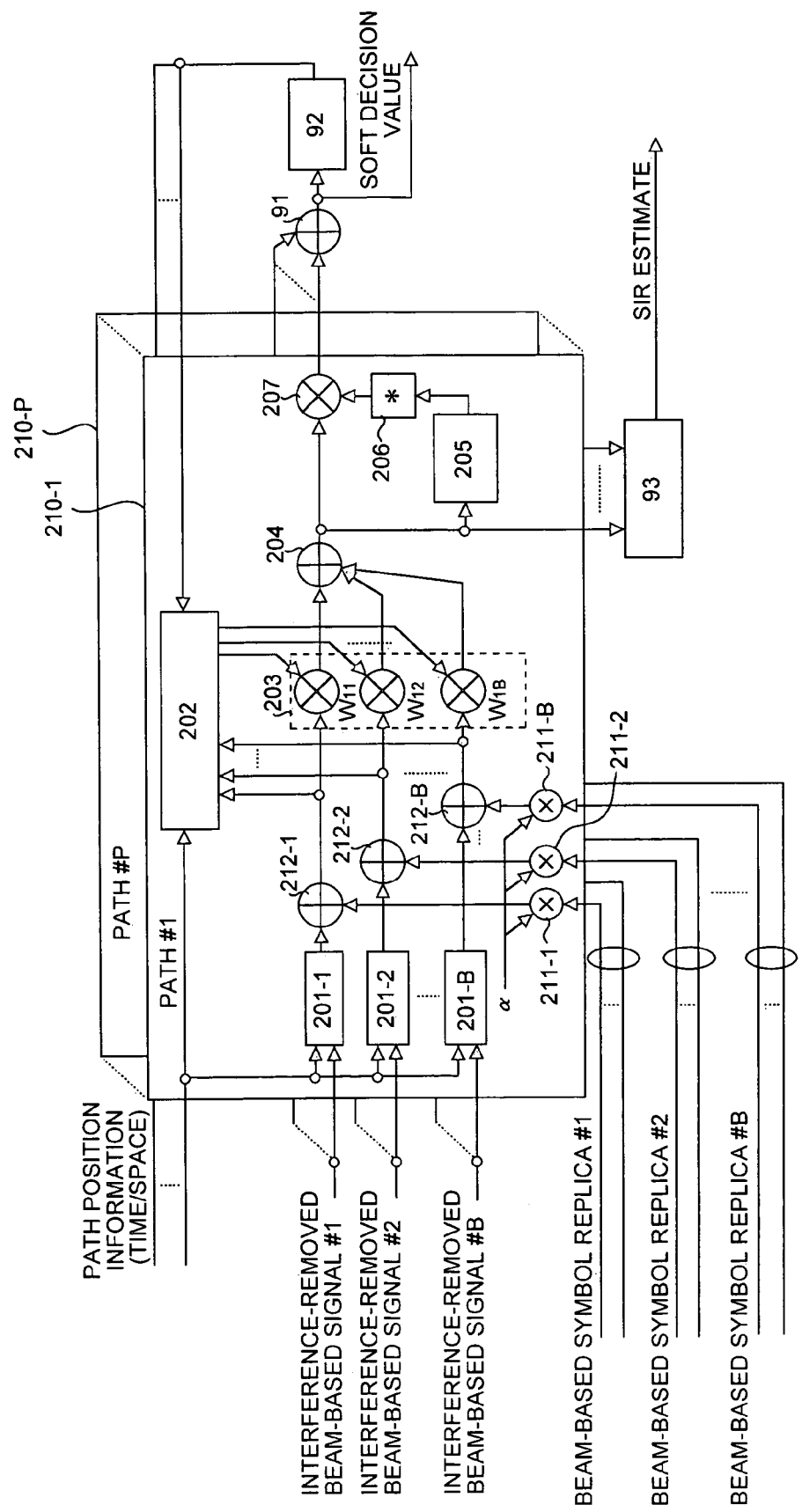
FIG. 10 is a block diagram of high-rate user adaptive beam demodulators.

Operations of the high-rate user adaptive beam demodulators (HRUABDEM) 15-1 to 15-$N_H$ will next be explained. FIG. 10 is a block diagram of the high-rate user adaptive beam demodulators 15-1 to 15-$N_H$. In FIG. 10, reference symbols 210-1 to 210-P denote path-based fading compensation sections, 211-1, 211-2, . . . , and 211-B multipliers, and 212-1, 212-2, . . . , and 212-B adders. Since the high-rate user adaptive beam demodulators are equal in configuration, the operations thereof will be explained using the configuration of the high-rate user adaptive beam demodulator 15-1.

Only the different operations of the high-rate user adaptive beam demodulators from those of the low-rate user adaptive beam demodulators will be explained. The high-rate user adaptive beam demodulator 15-1 receives the interference-removed beam-based signals #1 to #B from the subtracters 11-1 to 11-B, respectively. In addition, the high-rate user adaptive beam demodulator 15-1 receives the path position information (time/space) from the high-rate user multi-beam interference canceller demodulator 7-1 and the beam-based symbol replicas #1 to #B. Since the path-based fading compensation sections are equal in configuration, the operations will be explained using the configuration of the path-based fading compensation section 21 0-1.

In the path-based fading compensation section 210-1, the multipliers 211-1 to 211-B multiply the beam-based symbol replicas #1 to #B by the factor $\alpha$ ($0<\alpha<1$), respectively. The adders 212-1 to 212-B add up the multiplication results and the beam-based despread signals, respectively.

The weight generation section 202 that corresponds to the path #1 receives the path position information, the beam-based addition results, and the decision value after adaptive beam formation, and calculates a weight according to the MMSE-standard algorithm such as LMS, RLS, or SMI (similarly to the low-rate user adaptive beam demodulator).

The multiplier 203 that corresponds to the path #1 multiplies, for example, the weight vector $W_1=[w_{11}, w_{12}, \ldots, w_{1B}]^T$ for the path #1 generated by the weight generation section 202 (note, in the element $w_{ij}$ of the weight vector, i represents a path number and j represents a beam number) by the despread signals, respectively. Since later processings are equal to those of the low-rate user adaptive beam demodulator, they will not be explained herein.

As explained above, the high-rate user adaptive beam demodulators receive the interference-removed beam-based signals, so that the demodulation accuracy can be improved.

Figure 11:
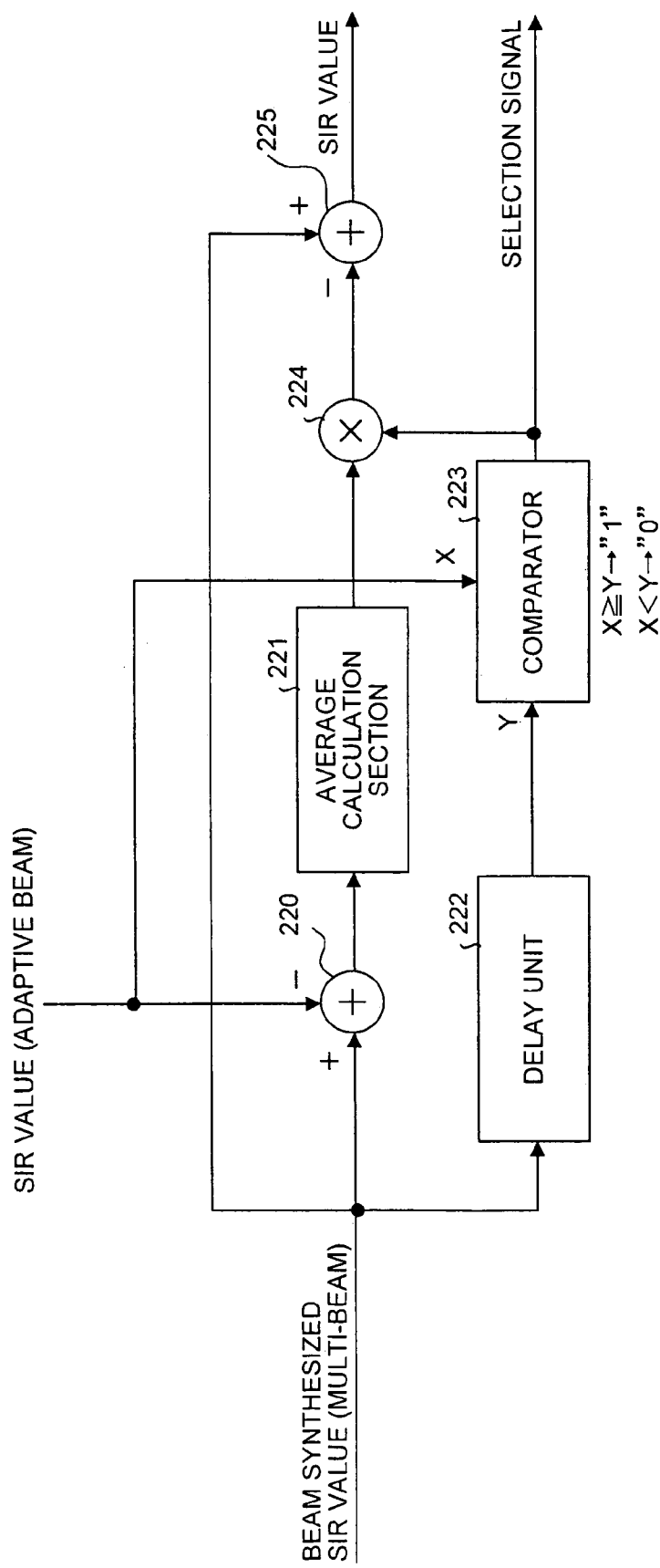
FIG. 11 is a block diagram of SIR correction sections.

Operations of the SIR correction sections 13 and 16 will next be explained. FIG. 11 is a block diagram of the SIR correction sections 13 and 16. In FIG. 11, reference symbols 220 and 225 denote subtracters, 221 an average calculation section, 222 a delay unit, 223 a comparator, and 224 an adder. Since the SIR correction sections 13 and 16 are equal in configuration, the operations thereof will be explained using the configuration of the SIR correction section 13.

The SIR correction section 13 receives the beam synthesized SIR values output from the low-rate user multi-beam demodulators and those output from the low-rate user adaptive beam demodulators, respectively.

The subtracter 220 subtracts the SIR values from the beam synthesized SIR value. The averaging calculation section 221 performs an averaging processing over a plurality of slots, and calculates an SIR correction quantity. The multiplier 224 performs a multiplication processing based on a selection signal of "0" or "1" output from the comparator 223. In this embodiment, if the output of the comparator 223 is "1", the SIR correction section 13 makes an SIR correction. If the output of the comparator 223 is "0", the SIR correction section 13 does not make the SR1 correction. The subtracter 225 subtracts the SIR correction quantity from the SIR values output from the low-rate user multi-beam demodulators, and outputs a corrected SIR value for high-rate TPC.

Further, the SIR values from the low-rate user multi-beam demodulators are delayed by the delay unit 222 in consideration of processing delays generated until the interference canceling, and input to the comparator 223 so that the delayed SIR values are equal in time to those from the low-rate user adaptive beam demodulators. By way of example, as shown in FIG. 11, the comparator 223 outputs the selection signal "1" at X≧Y and outputs the selection signal "0" at X<Y. This selection signal is also used by a soft decision data selection section to be explained later as a selection signal for selecting the soft decision value of the demodulator having a higher SIR value.

Effects obtained when the SIR correction sections are employed will be explained.

Before, for example, the algorithm converges for the beam formation in the low-rate user adaptive beam demodulators and the high-rate user adaptive beam demodulators, there is a probability that interferences cannot be sufficiently suppressed and, therefore, that the SIR values of the low-rate user multi-beam demodulators and those of the high-rate user multi-beam interference canceller demodulators are better than those of the low-rate user adaptive beam demodulators and those of the high-rate user adaptive beam demodulators. If so, by utilizing the demodulation results having the greater SIR values, it is possible to improve the demodulation characteristics.

By subtracting the SIR values obtained during the adaptive beam demodulation from the beam-synthesized SIR values during the multi-beam demodulation, an SIR correction quantity is calculated and the SIR values during the multi-beam demodulation are corrected using this correction quantity. It is thereby possible to obtain the SIR value set in consideration of the improvement.

The SIR values during the adaptive beam demodulation are often worse than the SIR values during the multi-beam demodulation before the algorithm for the beam formation converges. If so, the SIR values during the multi-beam demodulation are employed so as not to increase transmit power. Further, if the SIR values during the adaptive beam demodulation are better than those during the multi-beam demodulation, no correction is made to the SIR values. Conversely, if the SIR values during the adaptive beam demodulation are worse than those during the multi-beam demodulation, the SIR values are corrected. Accordingly, it is possible to realize favorable and fast TPC with the transmit power hold down.

Operations of the soft decision data selection sections 14 and 17 will next be explained. Since the soft decision data selection sections 14 and 17 are equal in processing, the operations of the soft decision data selection section 14 will be explained herein.

The delay units 8-1 to 8-$N_L$ delay the soft decision values from the respective low-rate user multi-beam demodulators 6-1 to 6-$N_L$ so that the soft decision values from the low-rate user multi-beam demodulators obtained for the respective users and those from the low-rate user adaptive beam demodulators obtained for the respective users are simultaneously input to the soft decision data selection section 14. The soft decision data selection section 14 selects and outputs the soft decision value having a better SIR value based on the selection signal. Namely, at X≧Y (or X>Y), the soft decision data selection section 14 selects the X-side soft decision value, and at X<Y (or X≦Y), the soft decision data selection section 14 selects the Y-side soft decision value.

Effects obtained when the soft decision data selection sections will be explained.

As for the low-rate user, the soft decision value is selected from the demodulator having a better SIR estimate. Therefore, it is possible to obtain a good demodulation result even in a situation in which the algorithm for forming the adaptive beams does not sufficiently converge and the SIR values cannot be sufficiently improved such as an instance in which transmission data having a small time length such as packet transmission data is demodulated, or the mobile station moves at a high speed.

For the high-rate user, similarly to the low-rate user, the soft decision value is selected from the demodulator having a better SIR estimate. Therefore, it is possible to obtain a good demodulation result even in a situation in which the interferences cannot be sufficiently cancelled or the algorithm for forming the adaptive beams does not sufficiently converge such as an instance in which transmission data having a small time length such as packet transmission data is demodulated, or the mobile station moves at a high speed.

As explained so far, in this embodiment, the low-rate user multi-beam demodulators and the high-rate user multi-beam interference canceller demodulators remove the interference components of the respective beams of the multi-beams, and output, as demodulation results, the interference component-removed soft decision values. The low-rate user adaptive beam demodulators and the high-rate user adaptive beam demodulators perform the demodulation processings using the interference component-removed beam-based signals, and output the soft decision values as the demodulation results. Each of the low-rate user demodulators selects and outputs the optimum soft decision value based on the individually estimated SIR value. Likewise, each of the high-rate user demodulators selects and outputs the optimum soft decision value based on the individually estimated SIR value. It is thereby possible to obtain good demodulation characteristics.

In this embodiment, it is explained that the low-rate user multi-beam demodulators and the high-rate user multi-beam interference canceller demodulators are constituted separately for the sake of explanation. However, the present invention is not limited to the configuration and the same configuration may be shared between the low-rate user multi-beam demodulators and the high-rate user multi-beam interference canceller demodulators. In this case, the high-rate user multi-beam interference canceller demodulators are constituted as shown in FIG. 7 and FIG. 8 as explained while the low-rate user multi-beam demodulators are constituted as shown in FIG. 7, not FIG. 4.

Second Embodiment

In the first embodiment, the interference canceller performs the demodulation processing by inputting the multi-beams and forming the adaptive beams. In a second embodiment, by contrast, the interference canceller performs the demodulation processing by inputting a signal for each antenna element and forming beams by adaptive antenna demodulators.

Figure 12:
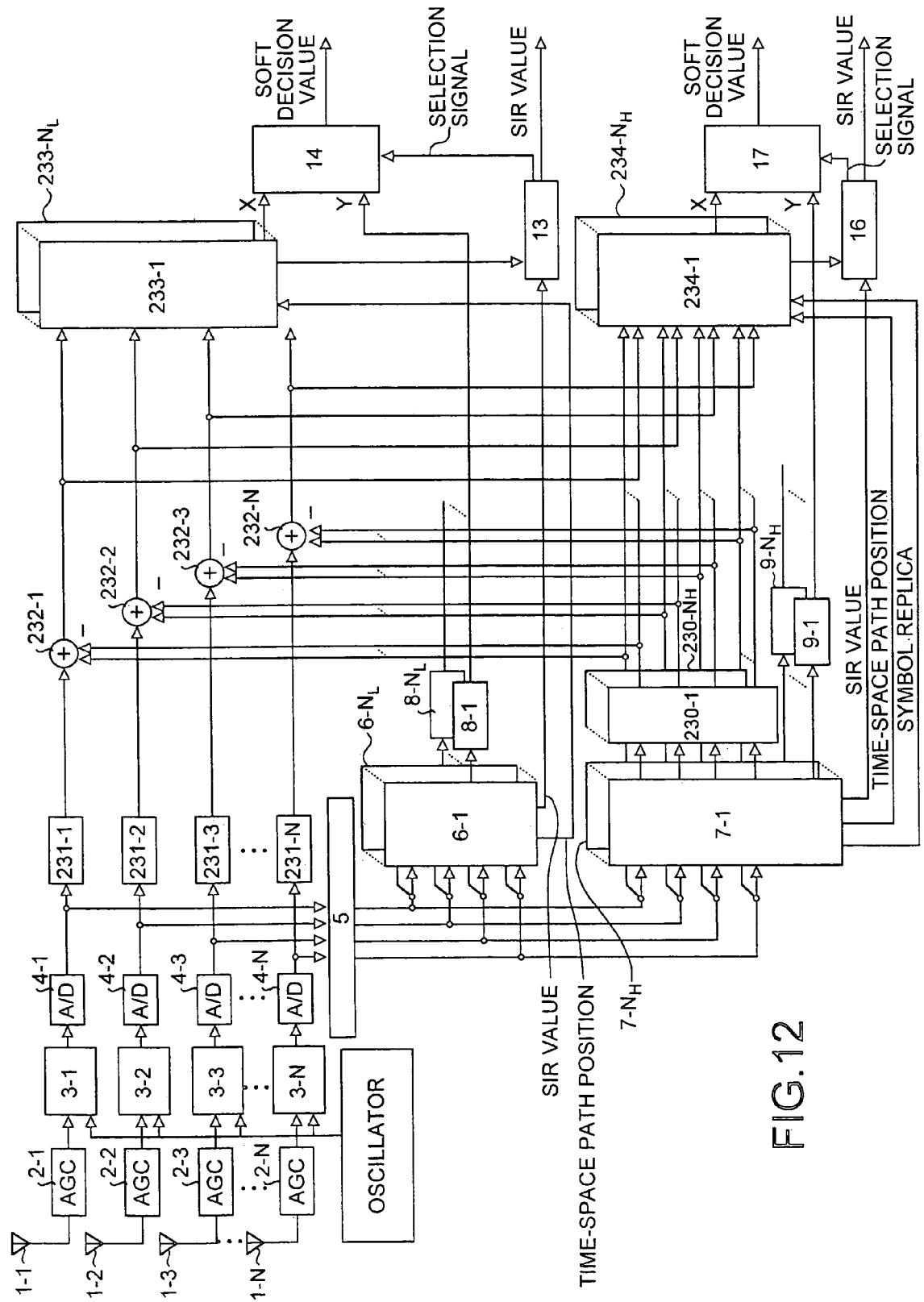
FIG. 12 is a block diagram of a second embodiment of the interference canceller according to the present invention.

FIG. 12 is a block diagram of the second embodiment of the interference canceller according to the present invention. In FIG. 12, reference symbols 230-1, . . . , and 230-$N_H$ denote inverse beam forming sections, 231-1, 231-2, . . . , and 232-N delay units, 232-1, 232-2, 232-3, . . . , and 232-N subtracters, 233-1, . . . , and 233-$N_L$ low-rate user adaptive antenna demodulators (LRUAADEM), and 234-1, . . . , and 234-$N_H$ high-rate user adaptive antenna demodulators (HRUAADEM). It is noted that the same constituent elements as those in the first embodiment are denoted by the same reference symbols, respectively and will not be explained herein.

Characteristic operations of the interference canceller in this embodiment will be explained. In this embodiment, only the different operations from those in the first embodiment will be explained.

The inverse beam forming sections 230-1 to 230-$N_H$ perform beam forming processings according to Equation (9). For example, if weight vectors for forming the beam-based signals #1 to #B are given as $M_1 = [M_{11}, M_{12}, \ldots, M_{1N}]^T$, $M_2 = [M_{21}, M_{22}, \ldots, M_{2N}]^T$, . . . , and $M_B = [M_{B1}, M_{B2}, \ldots, M_{BN}]^T$, respectively similarly to the first embodiment, a weight for inverse beam forming can be expressed as an inverse matrix $M^{-1}$ of the matrix M shown in Equation (1) as follows.

$$M^{-1} = \begin{bmatrix} M_{11} & M_{12} & \cdots & M_{1N} \\ M_{21} & M_{22} & \cdots & M_{2N} \\ \vdots & \vdots & & \vdots \\ M_{B1} & M_{B2} & \cdots & M_{BN} \end{bmatrix}^{-1} \quad (9)$$

The inverse beam forming sections 230-1 to 230-$N_H$ multiply this inverse matrix $M^{-1}$ by a vector expression $rz = [rz_1, rz_2, \ldots, rz_B]^T$ of the beam-based replica signals #1 to #B and a vector expression $rv = [rv_1, rv_2, \ldots, rv_B]^T$ of the beam-based symbol replicas #1 to #B output from the respective high-rate user multi-beam interference cancellers (7-1 to 7-$N_H$), respectively. As a result, inverse-beamformed beam-based replica signal $rz_I=[rz_{I1}, rz_{I2}, \ldots, rz_{IN}]^T$ and inverse-beam-formed beam-based symbol replica $rv_I=[rv_{I1}, ry_{I2}, \ldots, rv_{IN}]^T$ can be obtained. It is noted that N denotes the number of antennas.

The operations are performed according to Equations (10) and (11), respectively.

$$rz_I = M^{-1} \cdot rz \quad (10)$$

$$rv_I = M^{-1} \cdot rv \quad (11)$$

Thereafter, respective elements of the inverse-beam-formed replica signal $rz_I$ output from the inverse beam forming sections 230-1 to 230-$N_H$ are output to the subtracters 232-1 to 232-N for canceling interference components. In addition, respective elements of the inverse-beam-formed symbol replica $rv_I$ are output to the high-rate user adaptive antenna demodulators 234-1 to 234-N.

As explained above, if the inverse beam forming sections are employed, high-rate user interference replicas are generated from the fixed multi-beams, convergence time required until beam formation does not pose a problem. In addition, since the weights for the convergence that are calculated in advance can be employed, it is unnecessary to always perform an inverse matrix operation, thereby simplifying the signal processing.

The subtracters 232-1 to 232-N receive antenna-based signals #1 to #N delayed by the delay units 231-1 to 231-N, respectively, and the respective elements (#1 to #N) of the inverse-beam-formed replica signal $rz_I$ generated by the inverse beam forming sections 230-1 to 230-N. The subtracters subtract corresponding inverse-beam-formed replica signals #1 to #N from the antenna-bases signals #1 to #N, thereby removing interference components caused by the high-rate users.

The interference component-removed antenna-bases signals #1 to #N are output to the low-rate user adaptive antenna demodulators 233-1 to 233-$N_L$ and the high-rate user adaptive antenna demodulators 234-1 to 234-$N_H$.

Figure 13:
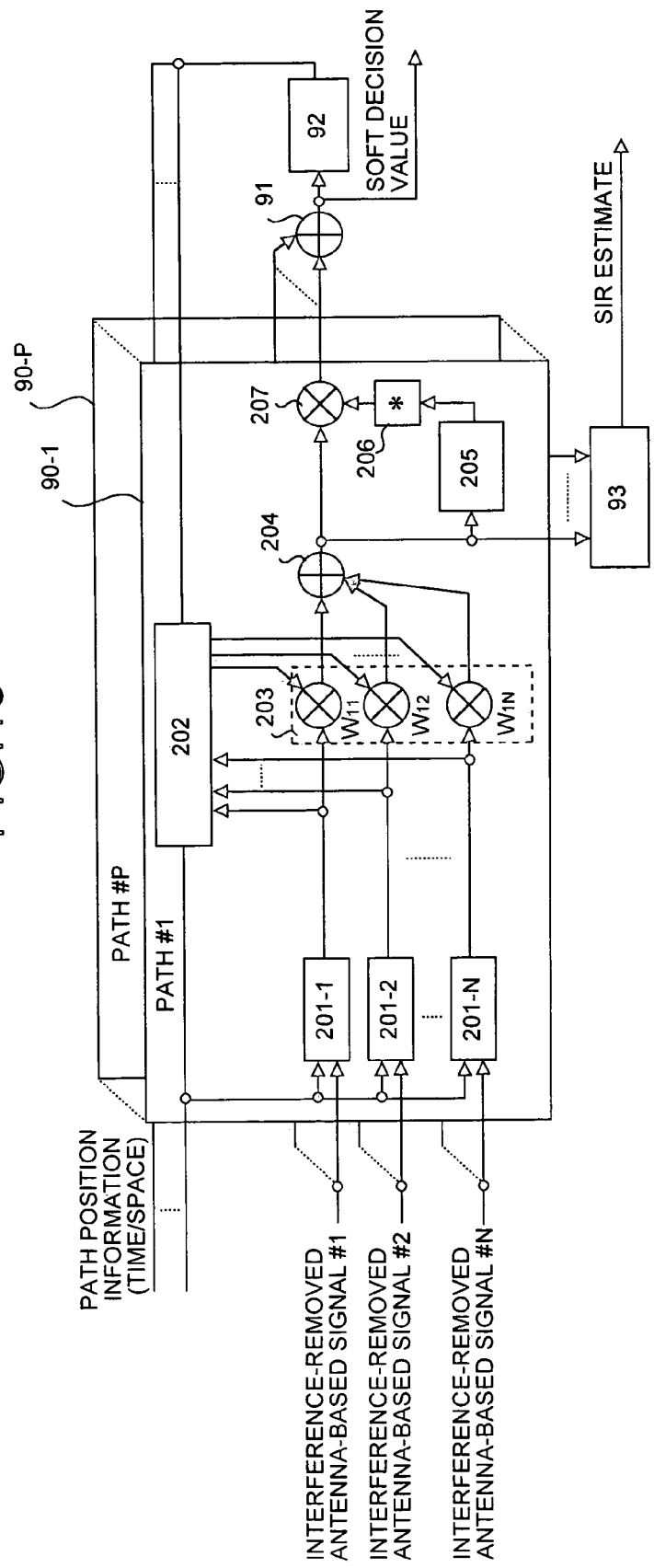
FIG. 13 is a block diagram of a low-rate user adaptive antenna demodulators.

Operations of the low-rate user adaptive antenna demodulators (LRUAADEM) 233-1 to 233-$N_L$ will next be explained. FIG. 13 is a block diagram of the low-rate user adaptive antenna demodulators 233-1 to 233-$N_L$, which configuration is equal to that of the low-rate user adaptive beam demodulators 12-1 to 12-$N_L$. Since the low-rate user adaptive antenna demodulators are equal in configuration, the operations thereof will be explained using the configuration of the low-rate user adaptive antenna demodulator 233-1.

The low-rate user adaptive antenna demodulator 233-1 receives the interference-removed antenna-based signals #1 to #N from the subtracters 232-1 to 232-N, respectively. In addition, the low-rate user adaptive antenna demodulator 233-1 receives path position information (time/space) from the path detection section 30 of the low-rate user multi-beam demodulator 6-1. Since the path-based fading compensation sections (90-1 to 90-P) are equal in configuration, the operations will be explained using the configuration of the path-based fading compensation section 90-1. It is assumed that the path-based fading compensation section 90-1 deals with paths equal in detected time-based positions for the B beams as equal paths.

In the path-based fading compensation section 90-1, the despreading sections 201-1 to 201-B that corresponds to the path #1 despread the interference-removed antenna-based signals at a timing obtained from the path position information for the respective antennas.

The weight generation section 202 that corresponds to the path #1 receives the path position information and a decision value after beam formation by an adaptive antenna to be explained later, and calculates a weight according to the MMSE-standard algorithm such as LMS, RLS, or SMI. As an initial value of the weight, a result of an addition of weights of a plurality of fixed multi-beams is set since the path equal in time-based position is received in the form of a plurality of fixed multi-beams (to thereby make it possible to accelerate algorithm convergence for beam formation).

The multiplier 203 that corresponds to the path #1 multiplies, for example, a weight vector $W_1=[w_{11}, w_{12}, \ldots, w^{1B}]^T$ for the path #1 generated by the weight generation section 202 (note, in the element $w_{ij}$ of the weight vector, i represents a path number and j represents a beam number) by the despread signals, respectively.

The synthesizer 204 that corresponds to the path #1 synthesizes the multiplication results, and generates a post-adaptive-antenna-beam-formation signal corresponding to the path #1. This post-adaptive-antenna-beam-formation signal is output to the channel estimate section 205 and the SIR estimate section 93. Since operations of the channel estimate section 205, the complex conjugate calculation section 206, and the SIR estimate section 93 are equal in those of the channel estimate section 52, the complex conjugate calculation section 54, and the SIR estimate section 41, respectively, they will not be explained herein.

The multiplier 207 that corresponds to the path #1 multiplies the post-beam-formation signal by a complex conjugate calculated by the complex conjugate calculation section 206, thereby compensating fading. Using the same procedures as those for the path #1, fading-compensated, post-beam-formation signals are calculated for the paths #2 to #P.

The synthesizer 91 synthesizes the P fading-compensated, post-beam-formation signals and outputs a soft decision result as a synthesis result. Finally, the decision section 92 makes a soft decision for weight generation based on the soft decision value.

As explained above, the low-rate user adaptive antenna demodulators receive only the antenna-based signals after removing the interferences caused by the high-rate users, i.e., only the low-rate user signals, so that the demodulation accuracy can be improved.

Figure 14:
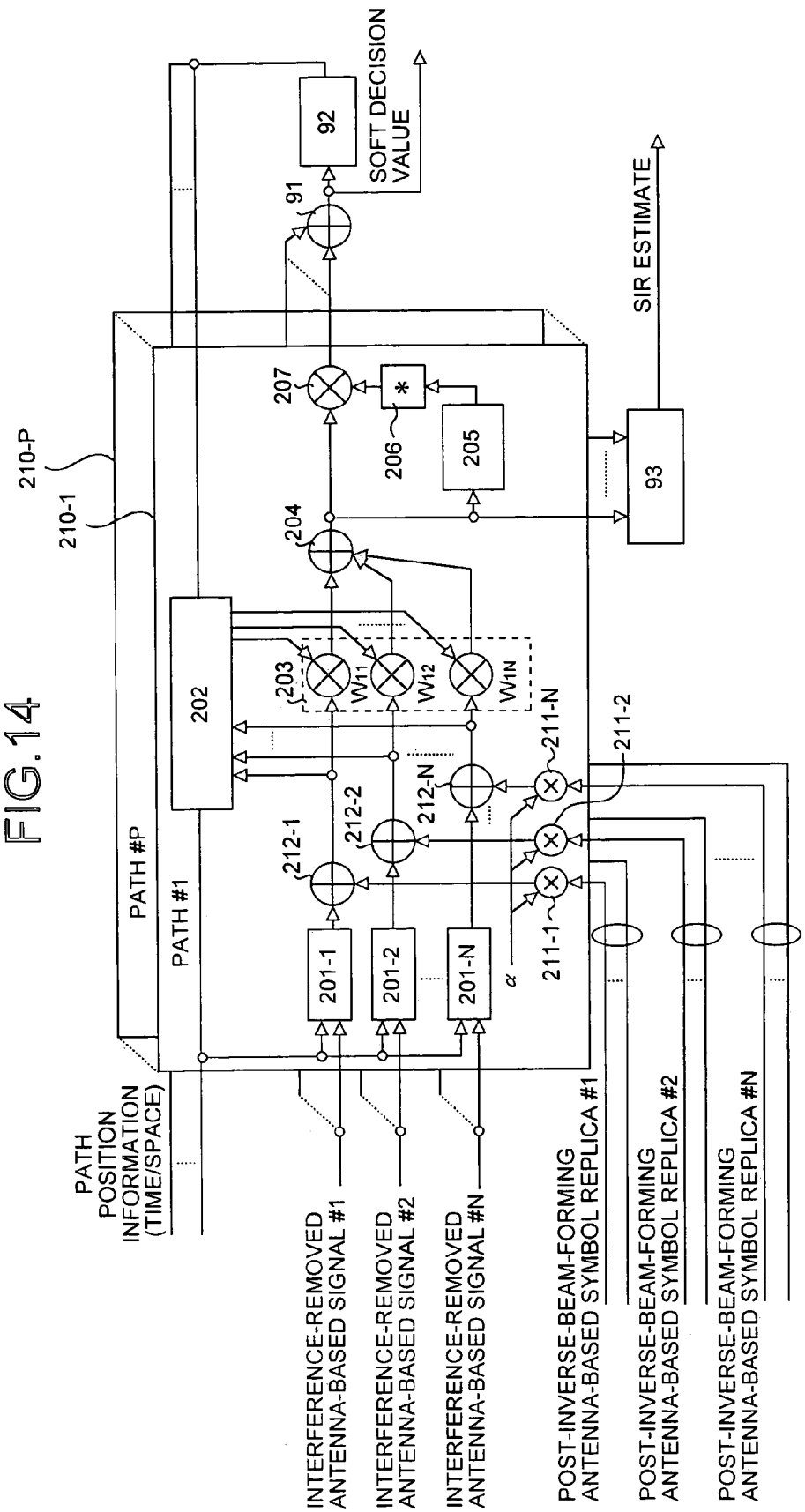
FIG. 14 is a block diagram of high-rate user adaptive antenna demodulators.
Figure 15:
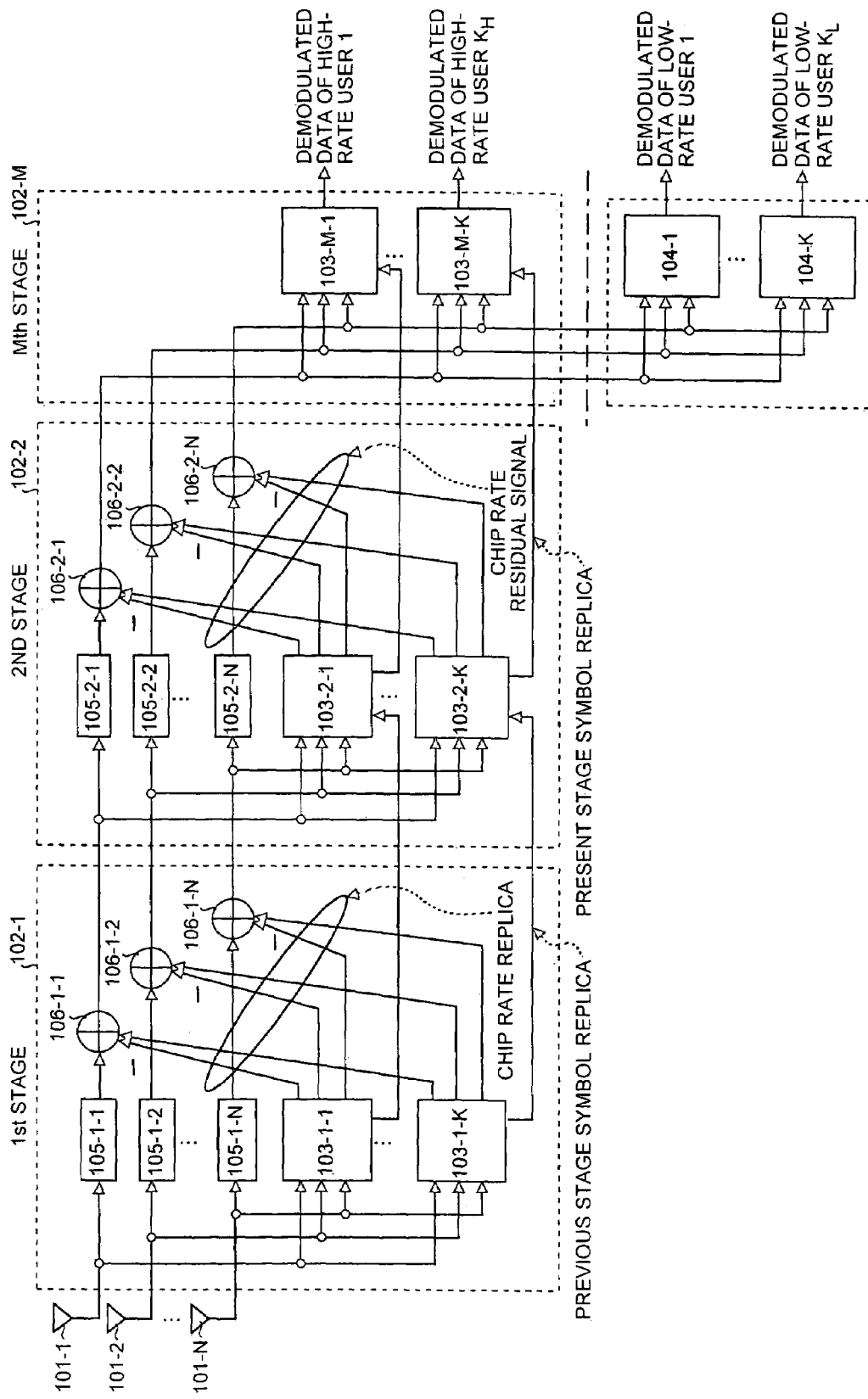
FIG. 15 is a block diagram of a conventional interference canceller.
Figure 16:
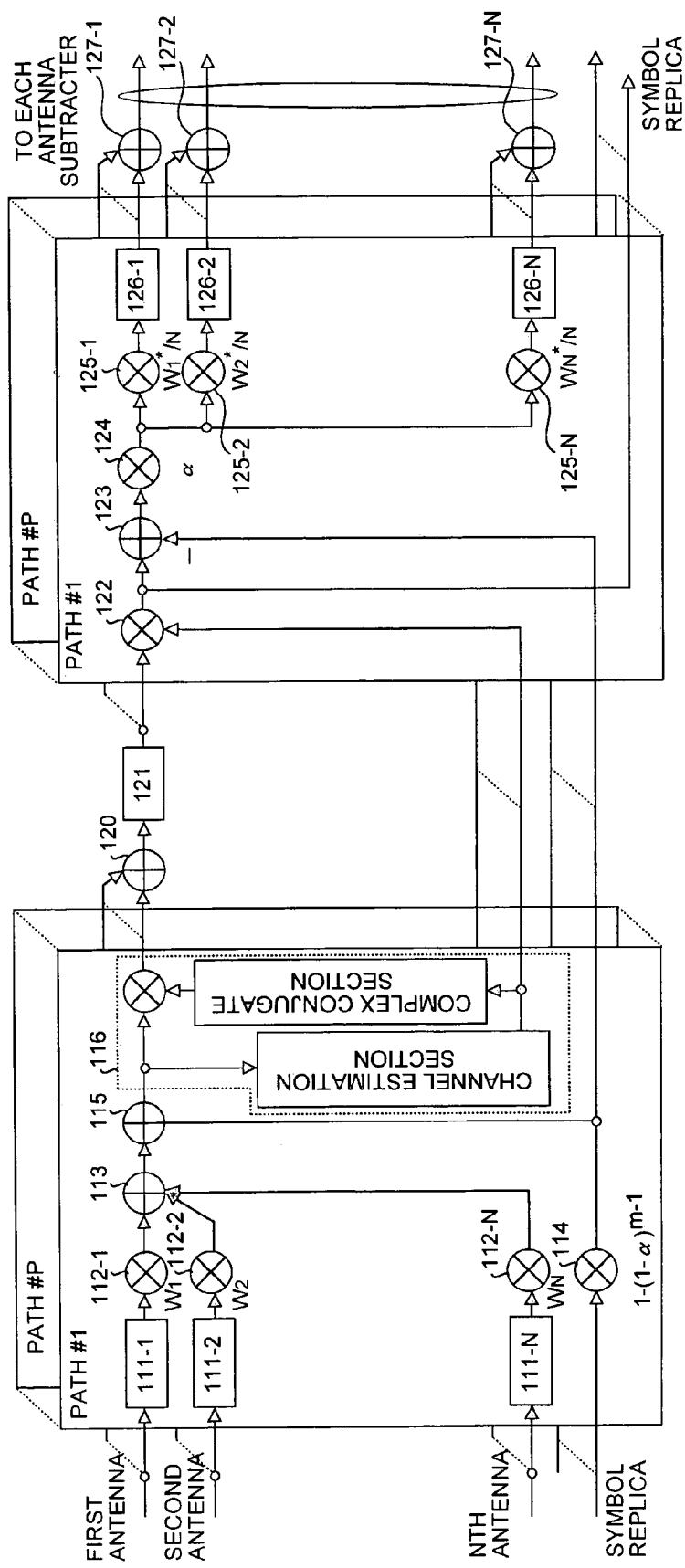
FIG. 16 is a block diagram of the IEU.
Figure 17:
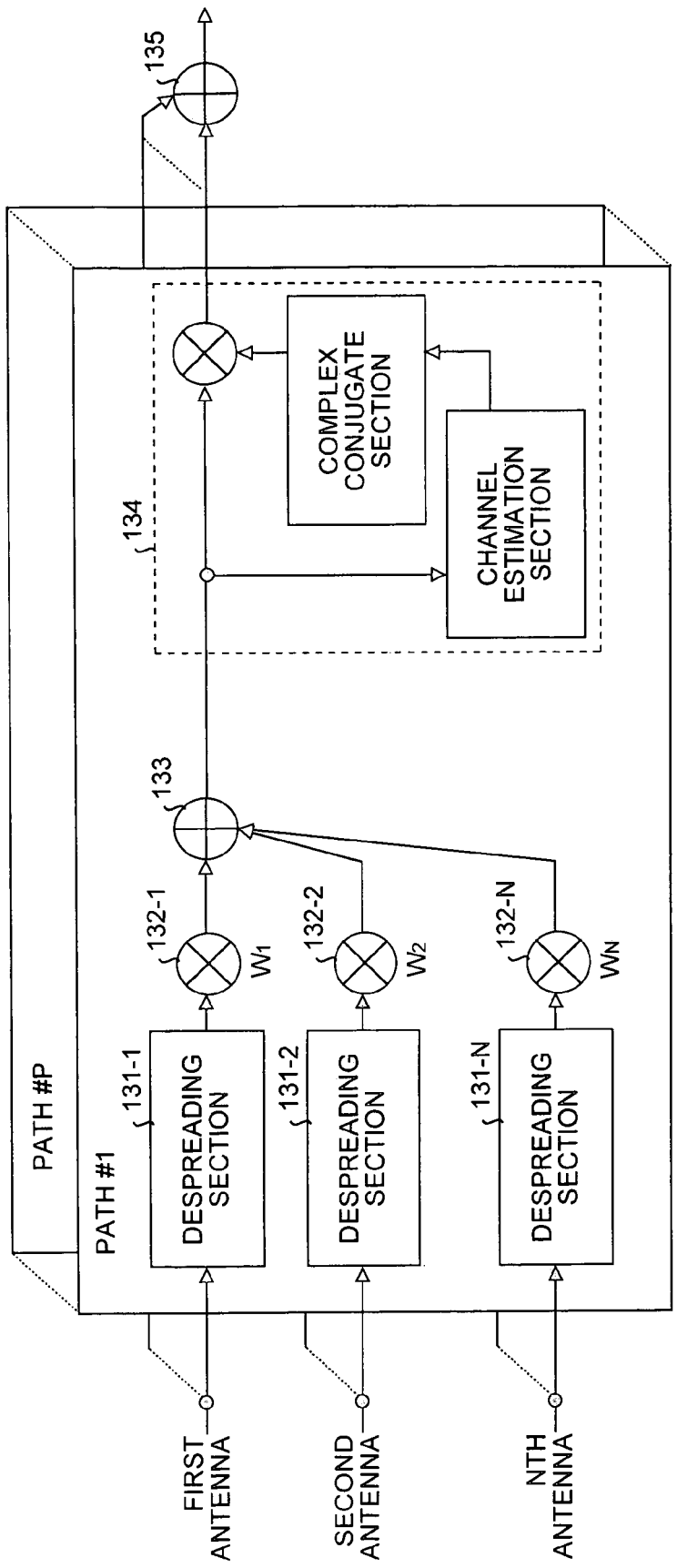
FIG. 17 is a block diagram of the DEM.

Operations of the high-rate user adaptive antenna demodulators (HRUAADEM) 234-1 to 234-$N_H$ will next be explained. FIG. 14 is a block diagram of the high-rate user adaptive antenna demodulators 234-1 to 234-$N_H$, which configuration is equal to that of the high-rate user adaptive beam demodulators 15-1 to 15-$N_H$. Since the high-rate user adaptive antenna demodulators are equal in configuration, the operations thereof will be explained using the configuration of the high-rate user adaptive antenna demodulator 234-1.

Only the different operations of the high-rate user adaptive antenna demodulators from those of the low-rate user adaptive antenna demodulators will be explained. The high-rate user adaptive antenna demodulator 234-1 receives the interference-removed antenna-based signals #1 to #B from the subtracters 232-1 to 232-B, respectively. In addition, the high-rate user adaptive antenna demodulator 234-1 receives the path position information (time/space) from the high-rate user multi-beam interference canceller demodulator 7-1 and the inverse-beam-formed antenna-based symbol replicas #1 to #B from the inverse beam forming sections 230-1 to 230-$N_H$, respectively. Since the path-based fading compensation sections are equal in configuration, the operations will be explained using the configuration of the path-based fading compensation section 210-1.

In the path-based fading compensation section 210-1, the multipliers 211-1 to 211-B multiply the inverse-beam-formed antenna-based symbol replicas #1 to #B by the factor α (0<α<1), respectively. The adders 212-1 to 212-N add up the multiplication results and the antenna-based despread signals, respectively.

The weight generation section 202 that corresponds to the path #1 receives the path position information, the antenna-based addition results, and the decision value after adaptive antenna beam formation, and calculates the weight according to the MMSE-standard algorithm such as LMS, RLS, or SMI (similarly to the low-rate user adaptive antenna demodulator).

The multiplier 203 that corresponds to the path #1 multiplies, for example, the weight vector $W_1=[w_{11}, w_{12}, \ldots, w_{1N}]^T$ for the path #1 generated by the weight generation section 202 (note, in the element $w_{ij}$ of the weight vector, i represents a path number and j represents a beam number) by the antenna-based addition signals, respectively. Since later processings are equal to those of the low-rate user adaptive antenna demodulator, they will not be explained herein.

As explained above, the high-rate user adaptive antenna demodulators receive the interference-removed antenna-based signals, so that the demodulation accuracy can be improved.

Effects obtained when the SIR correction sections 13 and 16 (see FIG. 11) similar to those in the first embodiment are employed will be explained.

Before, for example, the algorithm converges for the beam formation in the low-rate user adaptive antenna demodulators and the high-rate user adaptive antenna demodulators, there is a probability that interferences cannot be sufficiently suppressed and, therefore, that the SIR values of the low-rate user multi-beam demodulators and those of the high-rate user multi-beam interference canceller demodulators are better than those of the low-rate user adaptive antenna demodulators and those of the high-rate user adaptive antenna demodulators. If so, by utilizing the demodulation results having the greater SIR values, it is possible to improve the demodulation characteristics.

By subtracting the SIR values obtained during the adaptive antenna demodulation from the beam-synthesized SIR values during the multi-beam demodulation, the SIR correction quantity is calculated and the SIR values during the multi-beam demodulation are corrected using the SIR correction quantity. It is thereby possible to obtain the SIR value set in consideration of the improvement.

The SIR values during the adaptive antenna demodulation are often worse than the SIR values during the multi-beam demodulation before the algorithm for the beam formation converges. If so, the SIR values during the multi-beam demodulation are employed so as not to increase transmit power. Further, if the SIR values during the adaptive antenna demodulation are better than those during the multi-beam demodulation, no correction is made to the SIR values. Conversely, if the SIR values during, the adaptive antenna demodulation are worse than those during the multi-beam demodulation, the SIR values are corrected. Accordingly, it is possible to realize favorable and fast TPC with the transmit power hold down.

As explained so far, in this embodiment, the low-rate user multi-beam demodulators and the high-rate user multi-beam interference canceller demodulators remove the interference components of the respective beams of the multi-beams, and output, as demodulation results, the interference component-removed soft decision values. The low-rate user adaptive antenna demodulators and the high-rate user adaptive antenna demodulators perform the demodulation processings using the interference component-removed antenna-based signals, and output the soft decision values as the demodulation results. Each of the low-rate user demodulators selects and outputs the optimum soft decision value based on the individually estimated SIR value. Likewise, each of the high-rate user demodulators selects and outputs the optimum soft decision value based on the individually estimated SIR value. It is thereby possible to obtain good demodulation characteristics.

In this embodiment, it is explained that the low-rate user multi-beam demodulators and the high-rate user multi-beam interference canceller demodulators are constituted separately for the sake of explanation. However, the present invention is not limited to the configuration and the same configuration may be shared between the low-rate user multi-beam demodulators and the high-rate user multi-beam interference canceller demodulators.

As explained so far, according to one aspect of the present invention, the multi-beam demodulation unit removes interference components from the beam-based signals after multi-beam forming, and outputs, as a demodulation result, a soft decision value. The low-rate user adaptive beam demodulation unit removes the interference components caused by the high-rate users from the post-multi-beam-forming beam-based signals, performs a demodulation processing using the interference component-removed beam-based signals, and outputs a soft decision value as a demodulation result. In this way, the interference canceller consists of the multi-beam demodulation unit and the adaptive beam demodulation unit. Therefore, even if the algorithm for beam formation does not converge and the interference cannot be sufficiently suppressed in the low-rate user adaptive beam demodulation unit, it is advantageously possible to improve demodulation characteristics by employing the demodulation result of the multi-beam demodulation unit.

According to another aspect of the present invention, pass arriving directions are estimated by a simple method of spatially separating paths using the multi-beams, and the paths are normalized using an interference power for each beam. Therefore, it is advantageously possible to reduce the influence of an interference wave (can improve the SIR value) and improve a path detection accuracy. Further, by forming multi-beams in all sectors, it is advantageously possible to do a cell omnidirectional path search at a base station which may possibly receive a signal from one user at a plurality of sectors. In addition, it is advantageously possible to facilitate the demodulation processing since fixed multi-beams are common to all users.

According to still another aspect of the present invention, since signals are received in the form of the fixed multi-beams, it does not take a long time to converge beam formation as compared with the conventional art in which the algorithm of the adaptive array antenna is employed and a reception SIR value can be advantageously improved. In addition, since there is a probability that interference power differs among the multi-beams, the beam-based RAKE synthesized signals are normalized using the interference power estimated as the pilot symbol. Therefore, it is advantageously possible to easily deal with reception of a signal having a length close to a sloth length and having a small time length such as a packet signal or a RACH signal.

According to still another aspect of the present invention, the low-rate user adaptive beam demodulation unit receives only the beam-based signals after removing the interferences caused by the high-rate users, i.e., only the low-rate user signals, so that a demodulation accuracy can be advantageously, greatly improved.

According to still another aspect of the present invention, the soft decision value is adaptively selected and output from the demodulation means in a good state. Therefore, it is advantageously possible to obtain a good demodulation result even in a situation in which the algorithm for forming the adaptive beams does not sufficiently converge and the SIR values cannot be sufficiently improved.

According to still another aspect of the present invention, the low-rate user adaptive beam demodulation unit cannot often, sufficiently suppress interference before the algorithm for the beam formation converges. That is, the SIR values of the multi-beam demodulation unit are often better. If so, by employing the demodulation result having a higher SIR value, it is advantageously possible to improve the demodulation characteristics. Further, if the SIR values during the adaptive beam demodulation are better than those during the multi-beam demodulation, no correction is made to the SIR values. Conversely, if the SIR values during the adaptive antenna demodulation are worse than those during the multi-beam demodulation, the SIR values are corrected. Accordingly, it is advantageously possible to realize favorable and fast TPC with the transmit power hold down.

According to still another aspect of the present invention, by subtracting the SIR values during the adaptive beam demodulation from the SIR values during the multi-beam demodulation, an SIR correction quantity is calculated and the SIR values during the multi-beam demodulation are corrected using this correction quantity. It is thereby advantageously possible to obtain the SIR value set in consideration of an improvement.

According to still another aspect of the present invention, the soft decision value is selected from the demodulation unit having a better SIR estimate. Therefore, it is advantageously possible to obtain a good demodulation result even in a situation in which the algorithm for forming the adaptive beams does not sufficiently converge and the SIR values cannot be sufficiently improved such as an instance in which transmission data having a small time length such as packet transmission data is demodulated, or the mobile station moves at a high speed.

According to still another aspect of the present invention, the multi-beam demodulation unit removes interference components from the beam-based signals after multi-beam forming, and outputs, as a demodulation result, a soft decision value. The high-rate user adaptive beam demodulation unit removes the interference components caused by the high-rate users from the post-multi-beam-forming beam-based signals, performs a demodulation processing using the interference component-removed beam-based signals, and outputs a soft decision value as a demodulation result. In this way, the interference canceller consists of the multi-beam demodulation unit and the adaptive beam demodulation unit. Therefore, even if the algorithm for beam formation does not converge and the interference cannot be sufficiently suppressed in the low-rate user adaptive beam demodulation unit, it is advantageously possible to improve demodulation characteristics by employing the demodulation result of the multi-beam demodulation unit.

According to still another aspect of the present invention, the high-rate user adaptive beam demodulation unit receives the interference-removed beam-based signals, so that demodulation accuracy can be advantageously, greatly improved.

According to still another aspect of the present invention, the soft decision value is adaptively selected and output from the demodulation means in a good state. Therefore, it is advantageously possible to obtain a good demodulation result even in a situation in which the algorithm for forming the adaptive beams does not sufficiently converge and the SIR values cannot be sufficiently improved.

According to still another aspect of the present invention, the high-rate user adaptive beam demodulation unit, for example, cannot often, sufficiently suppress interference before the algorithm for the beam formation converges. That is, the SIR values of the multi-beam demodulation unit are often better. If so, by employing the demodulation result having a higher SIR value, it is advantageously possible to improve the demodulation characteristics. Further, if the SIR values during the adaptive beam demodulation are better than those during the multi-beam demodulation, no correction is made to the SIR values. Conversely, if the SIR values during the adaptive antenna demodulation are worse than those during the multi-beam demodulation, the SIR values are corrected. Accordingly, it is advantageously possible to realize favorable and fast TPC with the transmit power hold down.

According to still another aspect of the present invention, by subtracting the SIR values during the adaptive beam demodulation from the SIR values during the multi-beam demodulation, an SIR correction quantity is calculated and the SIR values during the multi-beam demodulation are corrected using this correction quantity. It is thereby advantageously possible to obtain the SIR value set in consideration of the improvement.

According to still another aspect of the present invention, the soft decision value is selected from the demodulation unit having a better SIR estimate. Therefore, it is advantageously possible to obtain a good demodulation result even in a situation in which the algorithm for forming the adaptive beams does not sufficiently converge and the SIR values cannot be sufficiently improved such as an instance in which transmission data having a small time length such as packet transmission data is demodulated, or the mobile station moves at a high speed.

According to still another aspect of the present invention, the multi-beam demodulation unit removes interference components from the antenna element-based signals after multi-beam forming, and outputs, as a demodulation result, a soft decision value. The low-rate user adaptive beam demodulation unit removes the interference components caused by the high-rate users from the post-multi-beam-forming antenna element-based signals, performs a demodulation processing using the interference component-removed beam-based signals, and outputs a soft decision value as a demodulation result. In this way, the interference canceller consists of the multi-beam demodulation unit and the adaptive beam demodulation unit. Therefore, even if the algorithm for beam formation by the adaptive antennas does not converge and the interference cannot be sufficiently suppressed in, for example, the low-rate user adaptive antenna demodulation unit, it is advantageously possible to improve demodulation characteristics by employing the demodulation result of the multi-beam demodulation unit.

According to still another aspect of the present invention, pass arriving directions are estimated by a simple method of spatially separating paths using the multi-beams, and the paths are normalized using an interference power for each beam. Therefore, it is advantageously possible to reduce the influence of an interference wave (can improve the SIR value) and improve a path detection accuracy. Further, by forming multi-beams in all sectors, it is advantageously possible to do a cell omnidirectional path search at a base station which may possibly receive a signal from one user at a plurality of sectors. In addition, it is advantageously possible to facilitate the demodulation processing since fixed multi-beams are common to all users.

According to still another aspect of the present invention, since signals are received in the form of the fixed multi-beams, it does not take a long time to converge beam formation as compared with the conventional art in which the algorithm of the adaptive array antenna is employed and a reception SIR value can be advantageously improved. In addition, since there is a probability that interference power differs among the multi-beams, the beam-based RAKE synthesized signals are normalized using the interference power estimated as the pilot symbol. Therefore, it is advantageously possible to easily deal with reception of a signal having a length close to a sloth length and having a small time length such as a packet signal or a RACH signal.

According to still another aspect of the present invention, the low-rate user adaptive antenna demodulation unit receives only the antenna element-based signals after removing the interferences caused by the high-rate users, i.e., only the low-rate user signals, so that the demodulation accuracy can be advantageously, greatly improved.

According to still another aspect of the present invention, the soft decision value is adaptively selected and output from the demodulation means in a good state. Therefore, it is advantageously possible to obtain a good demodulation result even in a situation in which the algorithm for forming the beams by the adaptive antennas does not sufficiently converge and the SIR values cannot be sufficiently improved.

According to still another aspect of the present invention, the low-rate user adaptive antenna demodulation unit cannot often, sufficiently suppress interference before the algorithm for the beam formation by the adaptive antennas converges. That is, the SIR values of the multi-beam demodulation unit are often better. If so, by employing the demodulation result having a higher SIR value, it is advantageously possible to improve the demodulation characteristics. Further, if the SIR values during the adaptive antenna demodulation are better than those during the multi-beam demodulation, no correction is made to the SIR values. Conversely, if the SIR values during the adaptive antenna demodulation are worse than those during the multi-beam demodulation, the SIR values are corrected. Accordingly, it is advantageously possible to realize favorable and fast TPC with the transmit power hold down.

According to still another aspect of the present invention, by subtracting the SIR values during the adaptive antenna demodulation from the SIR values during the multi-beam demodulation, an SIR correction quantity is calculated and the SIR values during the multi-beam demodulation are corrected using this correction quantity. It is thereby advantageously possible to obtain the SIR value set in consideration of an improvement.

According to still another aspect of the present invention, the soft decision value is selected from the demodulation unit having a better SIR estimate. Therefore, it is advantageously possible to obtain a good demodulation result even in a situation in which the algorithm for forming the beams by the adaptive antennas does not sufficiently converge and the SIR values cannot be sufficiently improved such as an instance in which transmission data having a small time length such as packet transmission data is demodulated, or the mobile station moves at a high speed.

According to still another aspect of the present invention, the multi-beam demodulation unit removes interference components from the beam-based signals after multi-beam forming, and outputs, as a demodulation result, a soft decision value. The high-rate user adaptive antenna demodulation unit removes the interference components caused by the high-rate users from the post-multi-beam-forming adaptive antenna-based signals, performs a demodulation processing using the interference component-removed beam-based signals, and outputs a soft decision value as a demodulation result. In this way, the interference canceller consists of the multi-beam demodulation unit and the adaptive antenna demodulation unit. Therefore, even if the algorithm for beam formation does not converge and the interference cannot be sufficiently suppressed in the low-rate user adaptive beam demodulation unit, it is advantageously possible to improve demodulation characteristics by employing the demodulation result of the multi-beam demodulation unit.

According to still another aspect of the present invention, the high-rate user adaptive antenna demodulation unit receives the interference-removed antenna element-based signals, so that demodulation accuracy can be advantageously, greatly improved.

According to still another aspect of the present invention, the soft decision value is adaptively selected and output from the demodulation means in a good state. Therefore, it is advantageously possible to obtain a good demodulation result even in a situation in which the algorithm for forming the beams by the adaptive antennas does not sufficiently converge and the SIR values cannot be sufficiently improved.

According to still another aspect of the present invention, the high-rate user adaptive antenna demodulation unit, for example, cannot often, sufficiently suppress interference before the algorithm for the beam formation converges. That is, the SIR values of the multi-beam demodulation unit are often better. If so, by employing the demodulation result having a higher SIR value, it is advantageously possible to improve the demodulation characteristics. Further, if the SIR values during the adaptive antenna demodulation are better than those during the multi-beam demodulation, no correction is made to the SIR values. Conversely, if the SIR values during the adaptive antenna demodulation are worse than those during the multi-beam demodulation, the SIR values are corrected. Accordingly, it is advantageously possible to realize favorable and fast TPC with the transmit power hold down.

According to still another aspect of the present invention, by subtracting the SIR values during the adaptive antenna demodulation from the SIR values during the multi-beam demodulation, an SIR correction quantity is calculated and the SIR values during the multi-beam demodulation are corrected using this correction quantity. It is thereby advantageously possible to obtain the SIR value set in consideration of the improvement.

According to still another aspect of the present invention, the soft decision value is selected from the demodulation unit having a better SIR estimate. Therefore, it is advantageously possible to obtain a good demodulation result even in a situation in which the algorithm for forming the beams by the adaptive antennas does not sufficiently converge and the SIR values cannot be sufficiently improved such as an instance in which transmission data having a small time length such as packet transmission data is demodulated, or the mobile station moves at a high speed.

Although the invention has been described with respect to a specific embodiment for a complete and clear disclosure, the appended claims are not to be thus limited but are to be construed as embodying all modification and alternative constructions that may occur to one skilled in the art which fairly fall within the basic teachings herein set forth.

INDUSTRIAL APPLICABILITY

As explained so far, the interference canceller according to the present invention is effective for mobile communication, satellite communication, in-house communication, and the like.

The invention claimed is:

1. An interference canceller comprising:
   a multi-beam forming unit that forms B beams using signals received from N antenna elements wherein directivity of each beam is fixed, and outputs beam signals corresponding to the respective B beams;
   a multi-beam demodulation unit that detects P paths using the beam signals, generates path position information corresponding to the paths, removes interference from each of the beam signals by calculating a channel estimate for each of the paths using the path position information, and synthesizes the beam signals from which the interference has been removed to generate a first beam-synthesized signal;
   a high-rate replica generation unit that generates a replica signal and a symbol replica for each of the beam signals using the path position information, the first beam-synthesized signal, and the channel estimate;
   a delay unit that delays each of the beam signals for a processing time to generate the replica signal in the high-rate user replica generation unit;
   an interference component removal unit that subtracts the replica signal from the corresponding beam signal delayed to remove interference components caused by a high-rate user signal from the beam signal; and
   a low-rate adaptive beam demodulation unit that generates adaptive beams by performing a weight control to the beam signals from which the interference components have been removed for each of the paths, and synthesizes adaptive beam signals corresponding to the respective adaptive beams to generate a first adaptive-beam-synthesized signal.

2. The interference canceller according to claim 1, wherein
   the multi-beam demodulation unit comprises:
      a beam path detection unit that generates an average power delay profile using a known sequence per slot of each of the beam signals, and detects paths corresponding to a desired signal from the average power delay profile; and
      a path selection unit that selects the paths in descending order of average power of the paths detected by the beam path detection unit, and outputs time and spatial positions corresponding to the paths selected as the path position information.

3. The interference canceller according to claim 1, wherein
   the multi-beam demodulation unit comprises:
      a RAKE synthesis unit that demodulates each of the beam signals to path signals corresponding to the respective paths using the channel estimate, calculates an interference power estimate for each of the beam signals for each of the paths, and RAKE-synthesizes the path signals for the each of the beam signals to generate RAKE-synthesized signals;
      a normalizing unit that normalizes each of the RAKE-synthesized signals using the interference power estimate for each of the beam signals; and
      a beam-synthesized signal generation unit that synthesizes all the RAKE-synthesized signals normalized to generate the first beam-synthesized signal.

4. The interference canceller according to claim 1, wherein
   the low-rate adaptive beam demodulation unit comprises:
      a first weight control unit that performs a weight control according to a predetermined algorithm based on the beam signals from which the interference components have been removed, the path position information, and a hard decision of the first adaptive-beam-synthesized signal;
      a first adaptive-beam signal generation unit that synthesizes the signals for which the weight control has been performed to generate an adaptive-beam signal for each of the paths;
      a first fading compensation unit that compensates for a fading of the adaptive-beam signal for each of the paths; and
      a first soft decision value output unit that synthesizes the adaptive-beam-signals compensated for the respective paths to output the first adaptive-beam-synthesized signal as a soft decision value.

5. The interference canceller according to claim 1, further comprising:
   a first selection unit that adaptively selects and outputs one of the first beam-synthesized signal and the first adaptive-beam-synthesized signal using a predetermined reference.

6. The interference canceller according to claim 5, further comprising:
   a first signal-to-interference ratio correction unit that calculates the path position information and a first signal-to-interference ratio estimate using a known sequence per slot of each of the beam signals, calculates a second signal-to-interference ratio estimate based on the adaptive-beam signals, compares the first signal-to-interference ratio estimate with the second signal-to-interference ratio estimate, and adaptively corrects a signal-to-interference ratio value based on a result of the comparison.

7. The interference canceller according to claim 6, wherein
   the first signal-to-interference ratio correction unit comprises:
      a first subtraction unit that subtracts the second signal-to-interference ratio estimate from the first signal-to-interference ratio estimate;
      a first correction value calculation unit that calculates an average of a result of the subtraction over a plurality of slots and calculates a signal-to-interference ratio correction value from the average; and
      a first comparison and correction unit that compares the first signal-to-interference ratio estimate with the second signal-to-interference ratio estimate and corrects the signal-to-interference ratio value using the signal-to-interference ratio correction value when the second signal-to-interference ratio estimate is equal to or more than the first signal-to-interference ratio estimate.

8. The interference canceller according to claim 6, wherein
the first selection unit selects the soft decision value corresponding to the good signal-to-interference ratio estimate out of the first signal-to-interference ratio estimate and the second signal-to-interference ratio estimate.

9. The interference canceller according to claim 1, further comprising:
a high-rate adaptive beam demodulation unit that adds for each of the paths, the beam symbol replicas to the beam signals from which the interference components have been removed, respectively, generates adaptive beams by performing a weight control to results of the addition, and synthesizes adaptive beam signals corresponding to the respective adaptive beams to generate a second adaptive-beam-synthesized signal.

10. The interference canceller according to claim 9, wherein
the high-rate adaptive beam demodulation unit comprises:
an addition unit that adds the beam symbol replicas with a weight to the beam signals from which the interference components have been removed, respectively;
a second weight control unit that performs a weight control according to a predetermined algorithm based on the beam signals from which the weight has been added, the path position information, and a hard decision of the second adaptive-beam-synthesized signal;
a second adaptive-beam signal generation unit that synthesizes the signals from which the weight control has been performed to generate an adaptive-beam signal for each of the paths;
a second fading compensation unit that compensates for a fading of the adaptive-beam signal for each of the paths; and
a second soft decision value output unit that synthesizes the adaptive-beam signals compensated for the respective paths to output the second adaptive-beam-synthesized signal as a soft decision value.

11. The interference canceller according to claim 9, further comprising:
a second selection unit that adaptively selects and outputs one of the first beam-synthesized signal and the second adaptive-beam-synthesized signal using a predetermined reference.

12. The interference canceller according to claim 11, further comprising:
a first signal-to-interference ratio correction unit that calculates the path position information and a third signal-to-interference ratio estimate using a known sequence per slot of each of the beam signals, calculates a fourth signal-to-interference ratio estimate based on the adaptive-beam signals in the high-rate adaptive beam demodulation unit, compares the third signal-to-interference ratio estimate with the fourth signal-to-interference ratio estimate, and adaptively corrects a signal-to-interference ratio value based on a result of the comparison.

13. The interference canceller according to claim 12, wherein
the first signal-to-interference ratio correction unit comprises:
a second subtraction unit that subtracts the fourth signal-to-interference ratio estimate from the third signal-to-interference ratio estimate;
a second correction value calculation unit that calculates an average of a result of the subtraction over a plurality of slots, and calculates a signal-to-interference ratio correction value from the average; and
a second comparison and correction unit that compares the third signal-to-interference ratio estimate with the fourth signal-to-interference ratio estimate, and corrects the signal-to-interference ratio value using the signal-to-interference ratio correction value when the fourth signal-to-interference ratio estimate is equal to or more than the third signal-to-interference ratio estimate.

14. The interference canceller according to claim 12, wherein
the second selection unit selects the soft decision value corresponding to the good signal-to-interference ratio estimate out of the third signal-to-interference ratio estimate and the fourth signal-to-interference ratio estimate.

15. An interference canceller comprising:
a multi-beam forming unit that forms B beams using antenna-based signals corresponding to respective signals received from N antenna elements, wherein directivity of each beam is fixed, and outputs beam signals corresponding to the respective B beams;
a multi-beam demodulation unit that detects P paths using the beam signals, generates path position information corresponding to the paths, removes interference from each of the beam signals by calculating a channel estimate for each of the paths using the path position information, and synthesizes the beam signals from which the interference has been removed to generate a first beam-synthesized signal;
a high-rate replica generation unit that generates a replica signal and a symbol replica, for each of the beam signals using the path position information, the first beam-synthesized signal, and the channel estimate;
an inverse beam forming unit that performs inverse beam forming to the beam replica signal and the beam symbol replica to generate N inverse-beam-formed replica signals and B×P inverse-beam-formed-symbol replicas;
a delay unit that delays each of the antenna-based signals for a processing time to generate the corresponding inverse-beam-formed replica signal in the inverse beam forming unit;
an interference component removal unit that subtracts the inverse-beam-formed replica signal from the corresponding antenna-based signal delayed to remove interference components caused by a high-rate user signal from the antenna-based signal; and
a low-rate adaptive antenna demodulation unit that generates adaptive beams by performing a weight control to the antenna-based signals from which the interference components have been removed for each of the paths, and synthesizes adaptive beam signals corresponding to the respective adaptive beams to generate a second beam-synthesized signal.

16. The interference canceller according to claim 15, wherein
the multi-beam demodulation unit comprises:
a beam path detection unit that generates an average power delay profile using a known sequence per slot of each of the beam signals, and detects paths corresponding to a desired signal from the average power delay profile; and a path selection unit that selects the paths in descending order of average power of the paths detected by the beam path detection unit, and outputs time and spatial positions corresponding to the paths selected as the path position information.

17. The interference canceller according to claim 15, wherein
the multi-beam demodulation unit comprises:
a RAKE synthesis unit that demodulates each of the beam signals to path signals corresponding to the respective paths using the channel estimate, calculates an interference power estimate for each of the beam signals for each of the paths, and RAKE-synthesizes the path signals for the each of the beam signals to generate RAKE-synthesized signals;
a normalizing unit that normalizes each of the RAKE-synthesized signals using the interference power estimate for each of the beam signals; and
a beam-synthesized signal generation unit that synthesizes all the RAKE-synthesized signals normalized to generate the first beam-synthesized signal.

18. The interference canceller according to claim 15, wherein
the low-rate adaptive antenna demodulation unit comprises:
a first weight control unit that performs a weight control according to a predetermined algorithm based on the beam signals from which the interference components have been removed, the path position information, and a hard decision of the second beam-synthesized signal;
a first adaptive-beam signal generation unit that synthesizes the signals from which the weight control has been performed to generate an adaptive-beam signal for each of the paths;
a first fading compensation unit that compensates for a fading of the adaptive-beam signal for each of the paths; and
a first soft decision value output unit that synthesizes the adaptive-beam signals compensated for the respective paths to output the second beam-synthesized signal as a soft decision value.

19. The interference canceller according to claim 15, further comprising:
a first selection unit that adaptively selects and outputs one of the first beam-synthesized signal and the second beam-synthesized signal using a predetermined reference.

20. The interference canceller according to claim 19, further comprising:
a first signal-to-interference ratio correction unit that calculates the path position information and a first signal-to-interference ratio estimate using a known sequence per slot of each of the beam signals, calculates a second signal-to-interference ratio estimate based on the adaptive-beam signals, compares the first signal-to-interference ratio estimate with the second signal-to-interference ratio estimate, and adaptively corrects a signal-to-interference ratio value based on a result of the comparison.

21. The interference canceller according to claim 20, wherein
the first signal-to-interference ratio correction unit comprises:
a first subtraction unit that subtracts the second signal-to-interference ratio estimate from the first signal-to-interference ratio estimate;
a first correction value calculation unit that calculates an average of a result of the subtraction over a plurality of slots, and calculates a signal-to-interference ratio correction value from the average; and
a first comparison and correction unit that compares the first signal-to-interference ratio estimate with the second signal-to-interference ratio estimate and corrects the signal-to-interference ratio value using the signal-to-interference ratio correction value when the second signal-to-interference ratio estimate is equal to or more than the first signal-to-interference ratio estimate.

22. The interference canceller according to claim 20, wherein
the first selection unit selects the soft decision value corresponding to the good signal-to-interference ratio estimate out of the first signal-to-interference ratio estimate and the second signal-to-interference ratio estimate.

23. The interference canceller according to claim 15, further comprising:
a high-rate adaptive beam demodulation unit that adds, for each of the paths, the inverse-beam-formed replica signals to the antenna-based signals from which the interference components have been removed, respectively, generates adaptive beams by performing a weight control to results of the addition, and synthesizes adaptive beam signals corresponding to the respective adaptive beams to generate a third beam-synthesized signal.

24. The interference canceller according to claim 23, wherein
the high-rate adaptive beam demodulation unit comprises:
an addition unit that adds the inverse-beam-formed symbol replicas with a weight to the antenna-based signals from which the interference components have been removed respectively;
a second weight control unit that performs a weight control according to a predetermined algorithm based on the antenna-based signals from which the weight has been added, the path position information, and a hard decision of the third beam-synthesized signal;
a second adaptive-beam signal generation unit that synthesizes the signals from which the weight control has been performed to generate an adaptive-beam signal for each of the paths;
a second fading compensation unit that compensates for a fading of the adaptive-beam signal for each of the paths; and
a second soft decision value output unit that synthesizes the adaptive-beam signals compensated for the respective paths to output the third beam-synthesized signal as a soft decision value.

25. The interference canceller according to claim 23, further comprising:
a second selection unit that adaptively selects and outputs one of the first beam-synthesized signal and the third beam-synthesized signal using a predetermined reference.

26. The interference canceller according to claim 25, further comprising:
a first signal-to-interference ratio correction unit that calculates the path position information and a third signal-to-interference ratio estimate using a known sequence per slot of each of the beam signals, calculates a fourth signal-to-interference ratio estimate based on the adaptive-beam signals in the high-rate adaptive antenna demodulation unit, compares the third signal-to-interference ratio estimate with the fourth signal-to-interference ratio estimate, and adaptively corrects a signal-to-interference ratio value based on a result of the comparison.

27. The interference canceller according to claim 26, wherein the first signal-to-interference ratio correction unit comprises:
- a second subtraction unit that subtracts the fourth signal-to-interference ratio estimate from the third signal-to-interference ratio estimate;
- a second correction value calculation unit that calculates an average of a result of the subtraction over a plurality of slots and calculates a signal-to-interference ratio correction value from the average; and
- a second comparison and correction unit that compares the third signal-to-interference ratio estimate with the fourth signal-to-interference ratio estimate and corrects the signal-to-interference ratio value using the signal-to-interference ratio correction value when the fourth signal-to-interference ratio estimate is equal to or more than the third signal-to-interference ratio estimate.

28. The interference canceller according to claim 26, wherein the second selection unit selects the soft decision value corresponding to the good signal-to-interference ratio estimate out of the third signal-to-interference ratio estimate and the fourth signal-to-interference ratio estimate.

* * * * *